United States Patent
Volkel et al.

(10) Patent No.: US 9,670,077 B2
(45) Date of Patent: *Jun. 6, 2017

(54) REDOX DESALINATION SYSTEM FOR CLEAN WATER PRODUCTION AND ENERGY STORAGE

(71) Applicant: Palo Alto Research Center Incorporated, Palo Alto, CA (US)

(72) Inventors: Armin R. Volkel, Mountain View, CA (US); Saroj Kumar Sahu, Fremont, CA (US); Divyaraj Desai, San Jose, CA (US); Vedasri Vedharathinam, Sunnyvale, CA (US); Jessica Louis Baker Rivest, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,202

(22) Filed: Jun. 15, 2015

(65) Prior Publication Data

US 2015/0274555 A1    Oct. 1, 2015

Related U.S. Application Data

(63) Continuation-in-part of application No. 13/863,948, filed on Apr. 16, 2013, now Pat. No. 9,340,436.

(51) Int. Cl.
*H01M 8/18* (2006.01)
*H01M 8/20* (2006.01)
(Continued)

(52) U.S. Cl.
CPC .......... *C02F 1/4691* (2013.01); *C02F 1/4604* (2013.01); *C02F 1/4695* (2013.01);
(Continued)

(58) Field of Classification Search
CPC   C02F 2103/08; C02F 2303/10; C02F 1/4691; H01M 6/34; H01M 8/186; H01M 8/188; H01M 8/20

See application file for complete search history.

(56) References Cited

U.S. PATENT DOCUMENTS 2,799,638 A   7/1957   Roberts
3,761,369 A   9/1973   Tirrell
(Continued)

FOREIGN PATENT DOCUMENTS

EP         2343265 A1      7/2011

OTHER PUBLICATIONS

European Search Report for related application EP 14163773, dated Sep. 4, 2014.

(Continued)

*Primary Examiner* — Stewart Fraser
(74) *Attorney, Agent, or Firm* — The Marbury Law Group, PLLC

(57) ABSTRACT

An energy storage system employing a reversible salination-desalination process includes an electrochemical desalination battery (EDB) unit including an anode and a cathode. The EDB unit runs a salination process while storing energy from a direct current power supply unit, and runs a desalination process while releasing energy to an electrical load. The energy storage system can store power from a variable output electrical power supply unit such as solar cells and wind turbines while running a salination process, and release energy, e.g., during peak energy demand hours while running a desalination process. Combined with a capacitive deionization (CD) unit, the energy storage system can generate fresh water by running desalination processes in the EDB unit and the CD unit while releasing stored energy from the EDB unit. The energy storage unit can function as (Continued)

a dual purpose device for energy storage and fresh water generation.

20 Claims, 11 Drawing Sheets

(51) Int. Cl.
  *C02F 1/469* (2006.01)
  *C02F 1/46* (2006.01)
  *C02F 101/12* (2006.01)
  *C02F 103/08* (2006.01)
  *B01D 61/46* (2006.01)

(52) U.S. Cl.
  CPC .......... *B01D 61/46* (2013.01); *C02F 2101/12* (2013.01); *C02F 2103/08* (2013.01); *C02F 2201/46* (2013.01)

(56) References Cited

U.S. PATENT DOCUMENTS

| | | | |
|---|---|---|---|
| 3,996,064 A | 12/1976 | Thaller | |
| 4,396,475 A | 8/1983 | Stehlik | |
| 8,236,158 B2 * | 8/2012 | Sparrow | C02F 1/4693 204/522 |
| 8,889,281 B2 | 11/2014 | La Mantia et al. | |
| 2012/0135282 A1 * | 5/2012 | La Mantia | H01M 6/34 429/70 |
| 2014/0305800 A1 | 10/2014 | Sahu et al. | |
| 2015/0357651 A1 * | 12/2015 | Page | H01M 8/04798 429/499 |

OTHER PUBLICATIONS

D. Belanger, T. Brousse, J.W. Long, "Manganese oxides: battery materials make the leap to electrochemical capacitors," The Electrochemical Society Interface, (Spring 2008), pp. 49-52.

T. Brousse, P.-L. Taberna, O. Crosnier, R. Dugas, P. Guillemet, Y. Scudeller, Y. Zhou, F. Favier, D. Belanger, P. Simon, "Long-term cycling behavior of asymmetric activated carbon/MnO2 aqueous electrochemical supercapacitor," Journal of Power Sources (2007), vol. 173, p. 633-41.

S. Devaraj, N. Munichandraiah, "Effect of crystallographic Structure of MnO2 on its electrochemical capacitance properties," Journal of Physical Chemistry (2008), vol. 112, pp. 4406-4417.

Pasta, M. et al., "A Desalination Battery," NANO Letters, ACS Publications, 2012, pp. 839-843.

Q. Qu, L. Li, S. Tian, Wenling Guo, Yuping Wu, R. Holze, "A cheap asymmetric supercapacitor with high energy at high power: Activated carbon//K0.27Mn)2-0.6H2O," Journal of Power Sources (2010), vol. 195, pp. 2789-2794.

T. Xu, "Ion exchange membranes: state of their development and perspective," Journal of Membrane Science (2005), vol. 263, pp. 1-29.

Co-pending U.S. Appl. No. 14/740,203, "Redox Desalination System for Clean Water Production and Energy Storage," Inventors: Armin R. Volkel et al., filed Jun. 15, 2015.

\* cited by examiner

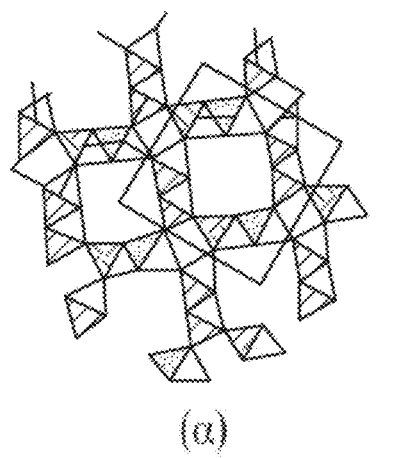 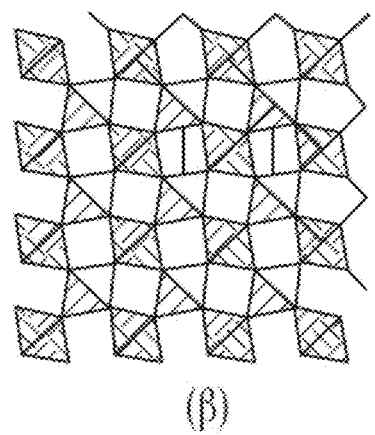
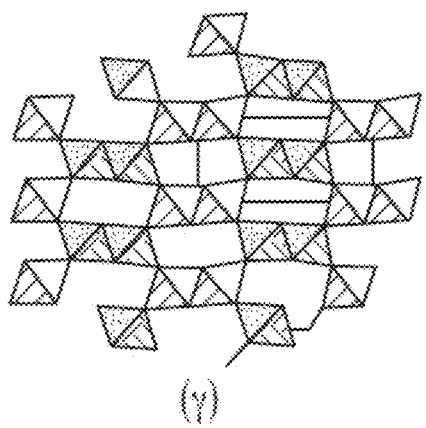 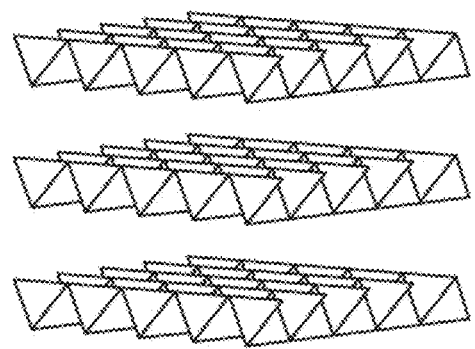
(α)   (β)   (γ)   (δ)
FIG. 1
PRIOR ART

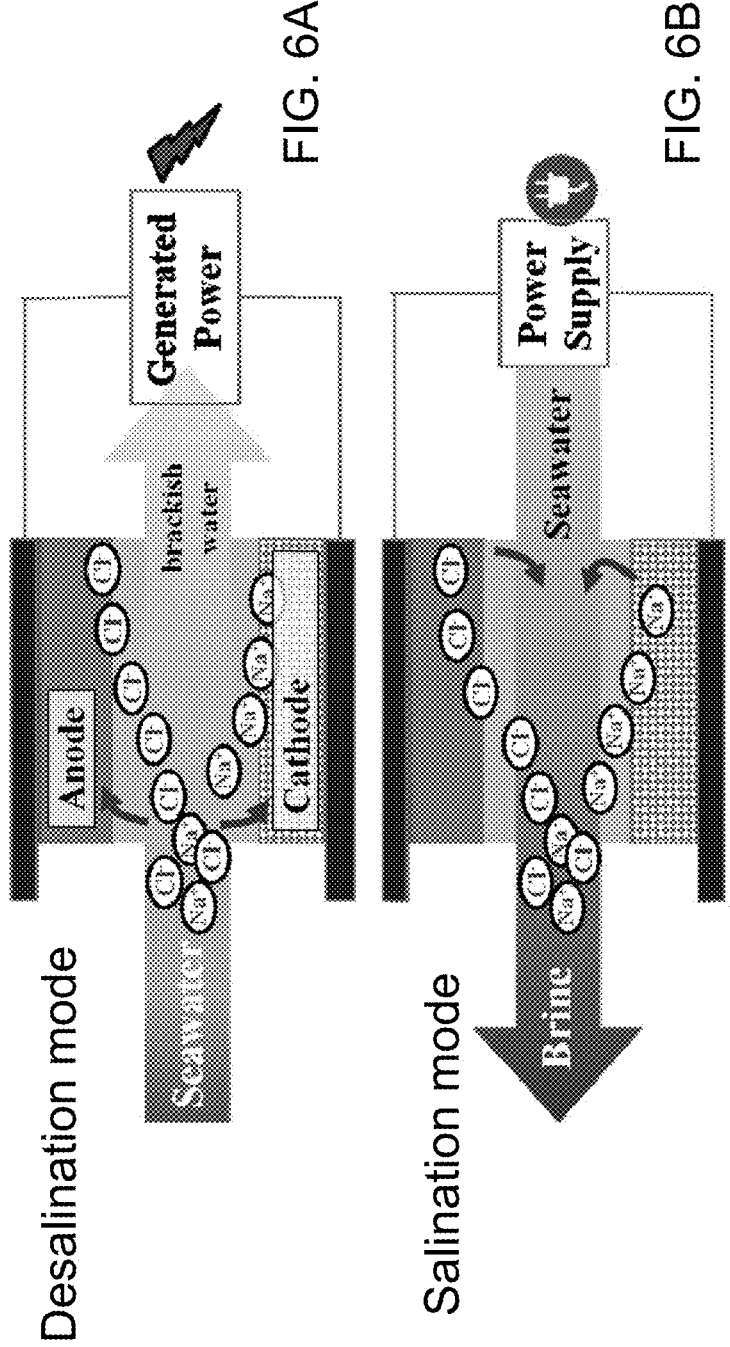

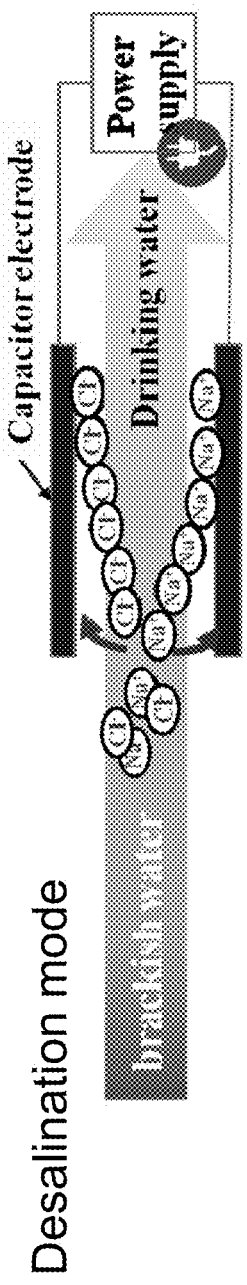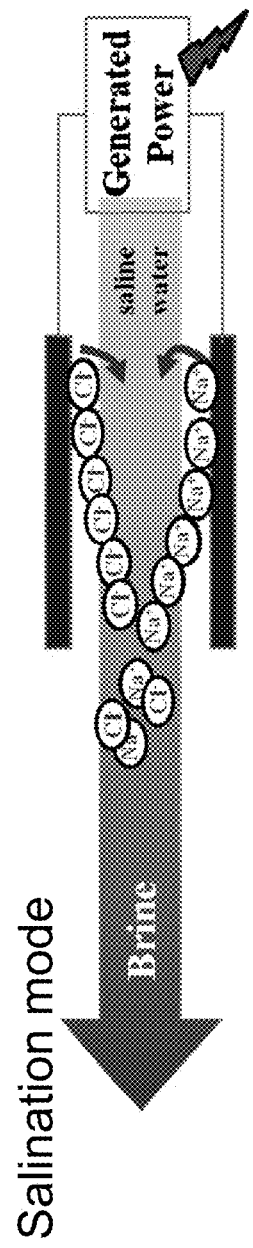

REDOX DESALINATION SYSTEM FOR CLEAN WATER PRODUCTION AND ENERGY STORAGE

RELATED APPLICATIONS

The present is a continuation-in-part application of U.S. patent application Ser. No. 13/863,948 filed on Apr. 16, 2014, the entire contents of which are incorporated herein by reference.

TECHNICAL FIELD

The present disclosure relates generally to the field of energy storage systems employing a reversible desalination-salination process, methods of operating the same, and an electrochemical battery for use in the same. The present disclosure is also relevant to the field of brine concentration and salt production.

BACKGROUND

97% of the water on earth is in the oceans. Only less than one percent of water on the earth's surface is suitable and readily available for direct consumption by human population and industries. Most of the surface fresh water is provided by rivers and lakes. Many places that do not have the geographic benefit of being close to such rivers and lakes suffer from a scarcity of fresh water. While transportation of fresh water from lakes and rivers through long pipelines, and drawing underground fresh water have been popular solutions, such resources are becoming scarcer as time goes by.

The salinity of water is usually represented by a total dissolved solid ("TDS") count, expressed in mg/L of salts dissolved. The salinity of sea water varies between 33,000 and 37,000 mg/L, and an average of 35,000 mg/L is accepted as the TDS count for sea water. Water with greater than 2,000-3,000 TDS is generally considered too salty to drink. Brackish water has no strict definition, and its salinity, depending on its location, may be between 2,000 and 35,000 TDS. Water having salinity in the range of 500 and 1,000 TDS is considered drinkable, but often has a strong taste. Most public water supplies in the world keep the TDS count below 500 for fresh water.

Sea water contains many species of salts. On average, out of 35,000 mg/L of TDS in sea water, sodium chloride contributes 30,000 mg/L, with the remaining 5,000 mg/L being primarily calcium, potassium, magnesium, and sulfate ions.

Obtaining fresh water by desalinating brackish and sea water has been an age-old practice. Thermal distillation was the earliest method used to desalinate sea water on a commercial basis, and improved distillation methods continue to be used today. The process involves distilling saline water and condensing the water vapor to obtain fresh water. While fresh water of great purity, for example below 25 TDS may be obtained with distillation, it remains an energy-intensive process due to the large specific heat and latent heat of vaporization of water. It is therefore commercially viable in places where plenty of waste heat is available, such as near power plants; where fresh water is scarce for natural reasons, such as arid coastal regions like the Persian Gulf; or where energy is available very inexpensively, such as in the Middle-East.

Modern technologies in thermal distillation include multistage flash ("MSF") and multi-effect distillation ("MED"). Because heat from the condensation of water vapor must be reutilized in order to make the distillation processes cost effective, thermo-mechanical arrangements are critical in such processes. Also, due to the thermal overhead, only very large distillation installations achieve good energy efficiency. In general, the energy consumption reaches 5-9 kWh/m$^3$ in large installations.

A reverse osmosis ("RO") process uses semi-permeable membranes and a driving hydraulic force of 150 to 1200 psi to remove dissolved solids from brackish or sea water. Under high pressure, water molecules move through the membrane whereas salt ions do so at a rate many orders of magnitude lower. Thus, the majority of dissolved salts are removed by the RO process. Generally, higher salinity source waters require higher pressures for desalination, and often, multiple pressure stages are employed to drive water through the RO membrane. RO is still an energy-intensive process, and typically, 3-10 kWh/m$^3$ of energy is required for sea water desalination using the RO process. Also, because the bulk of the water flows through the membrane, particulates and other impurities in the feed water can clog and foul the membrane unless the feed water is carefully pre-treated. Other problems with the RO process include its high installation and capital cost. In addition, because of the high driving pressure on the front side of an RO membrane, and the corresponding low back pressure, it is not uncommon that more than 70% of the feed water goes into the waste stream during the RO process.

Among modern desalination technologies, electrochemical methods have been employed. One such electrochemical method is electrodialysis ("ED"), which is a voltage-driven membrane process. An electric potential is used to move salts through a membrane, leaving fresh water behind as a product. ED takes advantage of the fact that most salts dissolved in water are ions, and are either positively charged or negatively charged. Because like charges repel each other and unlike charges attract, the ions will migrate toward electrodes having an opposite electric charge. Suitable membranes can be constructed to permit selective passage of either positive or negative ions. In a saline solution, dissolved ions such as positively-charged sodium and negatively-charged chloride ions migrate to opposite electrodes, passing through selected membranes that allow either cations or anions, but not both, to pass through. During the ED process, the salt content of the water channel is diluted, while concentrated solutions are formed at the electrodes. In an ED unit, membranes are usually arranged in an alternating pattern, with an anion-selective membrane followed by a cation-selective membrane. Concentrated and diluted solutions are created in the spaces between the alternating membranes, and the spaces bound by two membranes are called cells. Typical ED units consist of several hundred cells bound together with electrodes, and is referred to as a stack. Feed water passes through all of the cells simultaneously to provide a continuous flow of desalinated water and a steady stream of concentrate (brine) from the stack.

A variation of ED, called an electrodialysis reversal ("EDR") process operates on the same general principle as an ED unit, except that both the product and concentrate channels are identical in construction. At intervals of several times an hour, the polarity of the electrodes is reversed, causing ions to be attracted in the opposite direction across the membranes. Immediately following reversal, the product water is removed until the lines are flushed out and desired water quality restored. The flush takes just a few minutes before resuming water production. The reversal process is useful in breaking up and flushing out scales, slimes, and other deposits in the cells before their accumulation causes adverse effects. Flushing helps to reduce the problem of membrane fouling. Because the concentration gradient of the salts plays an important role in such a bipolar membrane structure, the voltage needed to maintain the gradient rises with the magnitude of the gradient. The voltage cannot be raised above the electrolytic decomposition voltage of water, which is about 1.3V, so the maximum salinity at which ED/EDR works is limited. As a result, this technology is normally used to desalinate brackish water, rather than high salinity water such as seawater.

Capacitive Deionization ("CD") is an electrosorption process whereby ions are removed from saline water using an electric field gradient as the driving force. The saline feed flows through electrodes comprised of materials such as carbon-based aerogels. These aerogels have very high surface areas, typically 400-1,000 $m^2/g$, which contributes to higher charge capacitance than a simple flat plate. A direct current is imparted, with a potential difference of 1-2 volts, and the cations are attracted to the cathode, while the anions are attracted to the anode. Ions are held at the surface of the electrode in an electric double layer. This technology can desalinate brackish water having an initial salinity of 2,000-10,000 TDS to below 500 TDS, thus making it drinkable. With good system design, typically, up to about 50 percent of the stored charging energy can be recovered in the discharging process. As a result, the net energy consumption of CD can be less than about 0.5 $kWh/m^3$. However, water having salinities higher than about 10,000 TDS cannot be desalinated using this process, as the concentration gradient across the capacitive field would be too large to be separated with the application of the electrostatic force.

As described, different existing desalination technologies have various benefits and shortcomings. For example, CD and ED technologies, although energy efficient, and scalable to small units commercially, are not suitable for sea water desalination. RO and thermal distillation technologies such as MED and MSF can be used for sea water desalination, but are energy demanding and do not scale commercially. To avoid these and other deficiencies, there is disclosed a novel electrochemical desalination method that is highly efficient, highly scalable, and is effective for desalinating high salinity water such as sea water.

SUMMARY

According to an aspect of the present disclosure, an energy storage system employing a reversible desalination-salination process is provided. The energy storage system comprises: an electrochemical desalination battery (EDB) unit comprising an anode and a cathode, wherein the anode is capable of accepting, and having a reversible redox reaction with, negative ions in water, and the cathode is capable of accepting, and having a reversible redox reaction with, positive ions from water; and a set of electrical wires and a set of electrical switches that are configured to switch electrical connections for the anode and the cathode between a desalination mode and a salination mode during operation of the EDB unit.

According to another aspect of the present disclosure, a method of operating an energy storage system employing a reversible desalination-salination process is provided. Electrical energy is stored in an electrochemical desalination battery (EDB) unit while running a salination process on water therein by applying a voltage bias voltage across an anode and a cathode of the EDB unit during operation in a salination mode. Electrical energy is released through an electrical load from the EDB unit while running a desalination process on water within the EDB unit during operation in a desalination mode.

According to yet another aspect of the present disclosure, an energy storage system employing a reversible desalination-salination process is provided, which comprises: an electrochemical desalination battery (EDB) unit comprising an anode and a cathode, wherein the anode is capable of accepting, and having a reversible redox reaction with, negative ions in water, and the cathode is capable of accepting, and having a reversible redox reaction with, positive ions from water; and a set of electrical switches configured to switch electrical connections for the anode and the cathode between a desalination mode and a salination mode during operation of the EDB unit. The anode comprises a material selected from cerium chloride, germanium chloride, vanadium chloride, europium chloride, and ferrous chloride, zinc, gallium, cerium, iron, copper, and gallium. The cathode comprises a compound selected from manganese oxide, copper hexacyanoferrate, prussian blue derivatives, vanadium pentoxide, and sodium ferricyanide.

According to still another aspect of the present disclosure, a system for the treatment of water is provided. The system comprising at least an electrochemical desalination battery (EDB) unit comprising: at least one water chamber configured to hold water to be treated; at least one negative-ion redox electrode comprising a solution of an electrolyte material selected from cerium chloride, germanium chloride, vanadium chloride, europium chloride, and ferrous chloride, and capable of accepting, and having a reversible redox reaction with, at least one negative ion in the water; at least one positive-ion redox electrode capable of accepting, and having a reversible redox reaction with, at least one positive ion in the water, wherein the positive-ion redox electrode is immersed in the water chamber or separated from the water chamber by an optional porous separator; and a membrane, e.g. an ion exchange membrane, separating the at least one negative-ion redox electrode from the water chamber.

According to even another aspect of the present disclosure, a method of desalinating water is provided. An electrochemical desalination battery (EDB) unit is provided, which comprises: at least one water chamber configured to hold water to be treated; at least one negative-ion redox electrode comprising a solution of an electrolyte material selected from cerium chloride, germanium chloride, vanadium chloride, europium chloride, and ferrous chloride, and capable of accepting, and having a reversible redox reaction with, at least one negative ion in the water; at least one positive-ion redox electrode capable of accepting, and having a reversible redox reaction with, at least one positive ion in the water, wherein the positive-ion redox electrode is immersed in the water chamber or separated from the water chamber by an optional porous separator; and a membrane, e.g. an ion exchange membrane, separating the at least one negative-ion redox electrode from the water chamber. Water having a first salinity is transported into the at least one water chamber. The water having the first salinity is desalinated to provide water having a second salinity that is lower than the first salinity employing the EDB unit. The water having the second salinity is removed from the EDB unit.

According to a further embodiment of the present disclosure, a system for treatment of water and energy storage is provided. The system comprises: an electrochemical desalination battery (EDB) unit comprising an anode and a cathode, wherein the anode is capable of accepting, and having a reversible redox reaction with, negative ions in water, and the cathode is capable of accepting, and having a reversible redox reaction with, positive ions from water; a capacitive deionization (CD) unit comprising a first electrode, a second electrode, and a water flow region located between the first and second electrodes; and a water flow control device to induce flow of water in different directions between a desalination mode and a salination mode. The water flow control device induces water to flow from the EDB unit to the CD unit during the desalination mode. The CD unit performs a desalination process while the EDB unit operates in the desalination mode to desalinate water therein. The CD unit performs a salination process while the EDB unit operates in the salination mode to salinate water therein.

According to an aspect of the present disclosure, an energy storage system employing a reversible desalination-salination process is provided, which comprises an electrochemical desalination battery (EDB) unit including an anode and a cathode, wherein the anode is capable of accepting, and having a reversible redox reaction with, negative ions in water, and the cathode is capable of accepting, and having a reversible redox reaction with, positive ions from water; and a set of electrical switches configured to switch electrical connections for the anode and the cathode between a desalination mode and a salination mode during operation of the EDB unit. The set of electrical switches is configured to connect the anode to a positive output voltage node of a DC power supply unit and connects the cathode to a negative output voltage node of the DC power supply unit, respectively, in the salination mode in which ions are released from the anode and the cathode and energy is stored in the EDB unit. The set of electrical switches is configured to connect the anode to a positive electrode of an electrical load and connects the cathode to a negative electrode of the electrical load, respectively, in the desalination mode in which the EDB unit desalinates water therein while releasing stored energy as output power employing the anode as a positive output electrode and the cathode as a negative output electrode.

According to another aspect of the present disclosure, a method of operating an energy storage system employing a reversible desalination-salination process is provided. Electrical energy is stored in an electrochemical desalination battery (EDB) unit while running a salination process on water therein by applying a DC bias voltage across an anode and a cathode of the EDB unit during operation in a salination mode. Electrical energy is released through an electrical load from the EDB unit while running a desalination process on water within the EDB unit during operation in a desalination mode.

According to yet another aspect of the present disclosure, an energy storage system employing a reversible desalination-salination process is provided, which includes an electrochemical desalination battery (EDB) unit comprising an anode and a cathode, wherein the anode is capable of accepting, and having a reversible redox reaction with, negative ions in water, and the cathode is capable of accepting, and having a reversible redox reaction with, positive ions from water; and an operational mode control device comprising a set of electrical switches configured to switch electrical connections for the anode and the cathode between a desalination mode and a salination mode during operation of the EDB unit. The anode comprises a material selected from cerium chloride, germanium chloride, vanadium chloride, europium chloride, and ferrous chloride, zinc, gallium, cerium, iron, copper, and gallium. The cathode comprises a compound selected from manganese oxide, copper hexacyanoferrate, prussian blue derivatives, vanadium pentoxide, and sodium ferricyanide.

It is an object of this disclosure to provide a method of electrochemical desalination with high energy efficiency and high scalability which work across a range of salinities, including high salinities such as sea water. It is also an object of this disclosure to provide a method of electrochemical desalination, which can be used to concentrate brine for other applications in a scalable and cost-effective way.

As a result, there is disclosed an electrochemical cell for treating water where the positive and negative salt ions are separated from the water volume; are either reduced or oxidized at respective electrodes; and remain physically dissolved, absorbed, adsorbed or intercalated as a result of application of an appropriate voltage. Also disclosed are methods for removing salts from water using such an electrochemical cell.

There is disclosed an electrochemical cell for treating water comprising at least one water chamber configured to hold water to be treated; at least one negative-ion redox electrode comprising reactants capable of accepting and having a reversible redox reaction with at least one negative ion in the water; at least one positive-ion redox electrode capable of accepting, and having a reversible redox reaction with, at least one positive ion in the water, wherein the positive-ion redox electrode is immersed in the water chamber or separated from the water chamber by an optional porous separator; and a membrane, e.g. an anion exchange membrane, separating the negative-ion redox electrode from the water chamber. The cell can be used to desalinate water having a wide range of salinities, including sea water, and brackish water. The cell can also be used to collect salt, which can subsequently used to concentrate industrial brine. Methods for using the electrochemical cell to treat water, such as desalinate saline solutions are disclosed. Also disclosed are methods for concentrated brine production for making salt.

The accompanying figures, which are incorporated in and constitute a part of this specification, illustrate several exemplary embodiments of the disclosure and, together with the description, serve to explain the principles of the disclosure.

In various embodiments, the anode comprises a liquid material chosen from cerium chloride, germanium chloride, vanadium chloride, europium chloride, and ferrous chloride as an electrolyte, or a solid material selected from zinc, gallium, cerium, iron, copper, and gallium, and the cathode comprises a liquid comprising sodium ferricyanide, sodium permanganate, and sodium dichromate, or a solid material chosen from manganese oxide, copper hexacyanoferrate, prussian blue derivatives, vanadium pentoxide, and prussian blue derivatives.

BRIEF DESCRIPTION OF THE DRAWINGS

FIG. 6A is a schematic illustration of the operational principle of an electrochemical desalination battery unit in the desalination mode according to an embodiment of the present disclosure.

FIG. 6B is a schematic illustration of the operational principle of an electrochemical desalination battery unit in the salination mode according to an embodiment of the present disclosure.

FIG. 7A is a schematic illustration of the operation principle of a capacitive deionization unit in the desalination mode according to an embodiment of the present disclosure.

FIG. 7B is a schematic illustration of the operation principle of a capacitive deionization unit in the salination mode according to an embodiment of the present disclosure.

DETAILED DESCRIPTION

Figure 1:
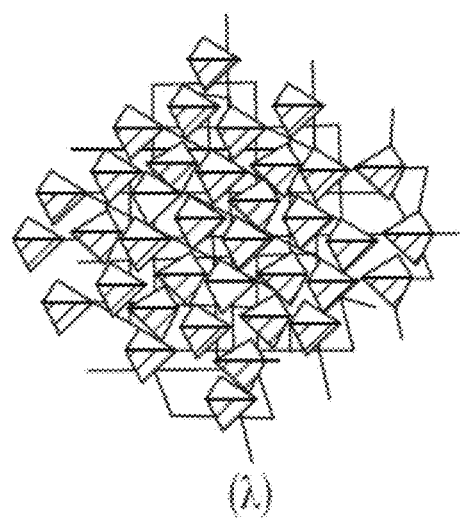
FIG. 1 is a schematic showing major crystalline structures of MnO2.

As used herein, "desalination" and variations thereof means the removal of individual ions, such as $Na^+$ and $Cl^-$ from an initial water source such that the salinity of desalinated water is less than the salinity of the initial water source.

As used herein, "salination," "resalination," and variations thereof means the addition of individual ions, such as $Na^+$ and $Cl^-$ to an initial water source such that the salinity of resalinated water is greater than the salinity of the initial water source.

As used herein, an "electrochemical cell" and variations thereof means a device capable of facilitating chemical reactions through the introduction of electrical energy.

As used herein, a "redox electrode" and variations thereof means an electro-active material or structure that serves as a host material into which guest ionic species are reversibly stored (i.e., accepted) from an electrolyte. The redox electrode may expressly or inherently contain a conductive current collector that facilitates electron transfer. The host material may be a solid.

As used herein, a "negative-ion redox electrode" and variations thereof means an electro-active material or structure that serves as a host material into which guest negative ion species are reversibly stored (i.e., accepted) from an aqueous solution. The negative-ion redox electrode may expressly or inherently contain a conductive current collector that facilitates electron transfer. The host material may be a solid.

As used herein, a "positive-ion redox electrode" and variations thereof means an electro-active material or structure that serves as a host material into which guest positive ion species are reversibly stored (i.e., accepted) from an aqueous solution. The positive-ion redox electrode may expressly or inherently contain a conductive current collector that facilitates electron transfer. The host material may be a solid.

As used herein, an "intercalation electrode" and variations thereof means a volume of an ionic solution that can change its state of oxidation as a result of the negative ion from the saline water entering this negative-ion redox electrode volume. The intercalation redox electrode may expressly or inherently contain a conductive current collector that facilitates electron transfer.

As used herein, a power supply or power supply unit can be any system or mechanism for supplying power. It should be noted that both AC and DC power supply units are contemplated in any embodiment herein where a power supply is exemplified, regardless of whether so stated and notwithstanding specific reference to an AC or DC power supply.

The storage of ions in the electrodes can be accomplished by intercalation, surface deposition/release, or capture in a liquid electrolyte. The electrode may expressly or inherently contain a conductive current collector that facilitates electron transfer.

The disclosure relates, in various exemplary embodiments, to methods for electrochemical desalination having high energy efficiency and high scalability, and which can be used to desalinate water having a varying degree of salinities, from a high salinity, such as sea water, to something less, such as brackish water.

There is disclosed an electrochemical cell for the treatment of water, such as for the desalination of water. In one embodiment, the electrochemical cell comprises at least one negative-ion redox electrode comprising reactants capable of storing a negative ion with a reversible redox reaction among the reactants. Non-limiting examples of the negative-ion redox electrode is one that comprises reactants capable of a ferrous-ferric redox reaction.

In one embodiment, the electrochemical cell comprises at least one crystalline positive-ion redox electrode capable of accommodating a positive ion, such as an positive-ion redox electrode comprising manganese oxide. Manganese oxide can assume several crystallographic forms, including α (alpha), β (beta), γ (gamma), δ (delta), and λ (lambda). As disclosed in Devaraj et al. ("Effect of Crystallographic Structure of $MnO_2$ on Its Electrochemical Capacitance Properties," J. Phys. Chem., (2008), 112, p. 4406-17), the entire contents of which are incorporated herein by reference, the alpha form includes one-dimensional tunnels, and the delta form is a two-dimensional layered compound. In one embodiment, the manganese oxide has a crystallographic form that maximizes intercalations, such as an alpha or delta form.

In an aqueous medium, salts are usually dissociated into positive ions ("cations") and negative ions ("anions"). The ions may be selectively transported with the application of an appropriate electric field from one aqueous volume to another through an appropriate membrane, which may be an ion-exchange, such as an anion-exchange or cation-exchange membrane, a mono-valent selective membrane, a di-valent selective membrane, or a semi-permanent membrane. Under an electric field, the anions and cations will move in opposite directions, each toward an oppositely charged electrode. Membranes that selectively allow primarily anions to pass through, but block most of cation transport are called anion exchange membranes ("AEM"). The electrochemical cell described herein further comprises an anion exchange membrane, having good chemical and mechanical stability, as well as low proton transport. In one embodiment, the anion exchange membrane is Fumasep® FAB (FuMA-Tech GmbH, Germany).

In one embodiment, the electrochemical cell comprises at least one water chamber configured to hold water to be treated, for example to be desalinated or resalinated. In various embodiments, such water to be desalinated comprises water having a salinity of at least 500 mg/L, such as a salinity ranging from 1000-35,000 mg/L. In another embodiment, the water to be resalinated comprises water having a salinity of less than 500 mg/L, such as a salinity of less than 100 mg/L or even less than 50 mg/L.

In one embodiment, the electrochemical cell further comprises a power supply capable of applying a voltage sufficient to make the negative-ion redox electrode more positive than the positive-ion redox electrode.

The electrochemical cell optionally comprises various outlets or chambers that can be utilized depending on the end-use. For example, the cell may comprise at least one outlet for the removal of treated water. The electrochemical cell may also comprise at least one chamber for the collection of salt.

There is also disclosed a method of desalinating water, that comprises flowing water having a salinity of at least 500 mg/L, such as a salinity ranging from 1,000-35,000 mg/L, through an electrochemical desalination cell comprising: at least one negative-ion redox electrode comprising reactants capable of storing a negative ion with a reversible redox reaction among the reactants; at least one crystalline positive-ion redox electrode capable of accommodating a positive ion; and an anion exchange membrane to produce a treated water having a salinity of less than 500 mg/L, such as a salinity of less than 250 mg/L, less than 100 mg/L, or less than 50 mg/L.

In one embodiment, the method utilizes various algorithms to control the flow of materials in and/or out of the cell. For example, the method may utilize an algorithm to fully or partially control the flow of the reactants or the water to be treated in and/or out of the cell.

In one embodiment, the method further comprises resalinating a previously desalinated system by connecting the negative-ion redox electrode and the positive-ion redox electrode to an electrical load, and releasing stored energy from the negative-ion redox electrode and the positive-ion redox electrode to the electrical load simultaneously with running a desalination process in the electrochemical battery including the negative-ion redox electrode and the positive-ion redox electrode. The electrical load can be a power grid connected through a set of electrical switches.

The method may also comprise applying a voltage with a power supply sufficient to make the negative-ion redox electrode more positive than the positive-ion redox electrode.

As previously mentioned, the present disclosure also provides an electrochemical desalination cell, and a method of using the same to concentrate brine for other applications in a scalable and cost-effective way. In this embodiment, the method further comprises collecting the salt removed by the desalination process, and adding the collected salt to industrial brine to increase its concentration.

The following provides a non-limiting, but more detailed explanation of the process and reaction schemes behind the present disclosure.

Redox Reaction at Negative-Ion Redox Electrode:
The electrode reactions may be represented by Reaction Scheme 1, below:

$$Cl^- + FeCl_2 \rightarrow FeCl_3 + e^-; \text{during oxidation,}$$

and $$FeCl_3 + e^- \rightarrow Cl^- + FeCl_2; \text{during reduction.} \quad \text{Reaction Scheme 1}$$

The chemical potential for Reaction Scheme 1 is about 0.7V.

The concentration of $FeCl_2$ ranges from about 0.1M to about 1M. The concentration of HCl ranges from about 0.1M to about 3M. In one exemplary embodiment, a 0.1M $FeCl_2$ solution in 0.1M HCl was used.

Sodium Intercalation in Manganese Oxide Matrix:
Metals having water-reactive ions, such as $Na^+$, $Li^+$, $K^+$, $Me^{2+}$, and $Ca^{2+}$ cannot be plated onto electrodes in aqueous solutions due to their high electrochemical potential. As a result, any attempt to plate these metals on a negative electrode in an electrochemical cell can result in a reaction with water and generation of hydrogen gas, rather than the metal plating. Therefore, removing such ions electrochemically from an aqueous solution cannot be done by plating. However, some of these Group I and II metal ions can be intercalated into a suitable transition metal compound, where they are insulated from the water. One such popular system is manganese oxide ($MnO_2$). $Na^+$ and $K^+$ intercalation into $MnO_2$ has been shown. However, not every crystallographic form of $MnO_2$ can intercalate base metals very well. FIG. 1 is a schematic showing major crystalline structures of $MnO_2$. As shown in FIG. 1, the alpha and delta forms of $MnO_2$ are preferred in one embodiment of the present disclosure.

The general reaction for $Na^+$ intercalation into $MnO_2$ can be represented by Reaction Scheme 2, below:

$$Na^+ + MnO_2 + e^- \rightarrow Na_x(MnO_2)_y, \text{ for intercalation,}$$

and $$Na_x(MnO_2)_y \rightarrow Na^+ + MnO_2 + e^- \text{ for de-intercalation} \quad \text{Reaction Scheme 2}$$

Reaction Scheme 2 is pseudo-capacitive in nature, as it deals with fractional ionic charges. Furthermore, Reaction Scheme 2 does not have a purely Nernstian standard electrode potential.

Figure 2:
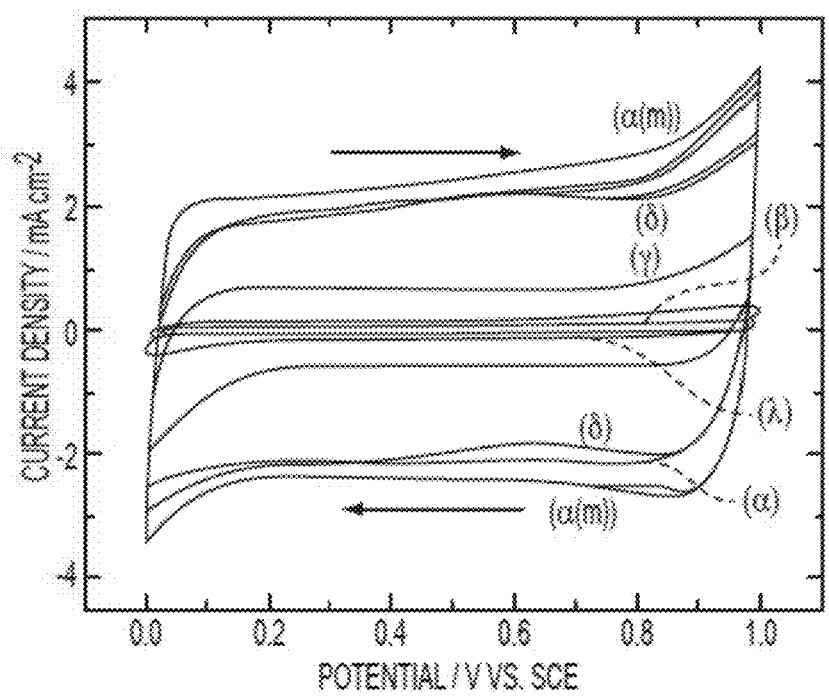
FIG. 2 is a cyclovoltammogram of Na—MnO2 for various MnO2 crystallographic forms.

FIG. 2 is a cyclovoltammogram of Na—$MnO_2$ for various $MnO_2$ crystallographic forms. Data points were recorded between 0 and 1.0 V vs. a reference electrode, the saturated calomel electrode (SCE), in aqueous 0.1 M $Na_2SO_4$ at a sweep rate of 20 mV/s. Most of the intercalation happens between 0.1V and 0.9V, as shown in FIG. 2.

It is generally accepted that $Na^+$ and $K^+$ can be reversibly intercalated and de-intercalated into and out of an appropriate $MnO_2$ matrix over a large number of cycles. This property is exploited in this disclosure. Although certain crystallographic forms of $MnO_2$ are disclosed herein, it is to be understood that other embodiments may use other crystals for $Na^+$ and $K^+$ intercalation. In fact, any crystalline compound that can host Na or K ions under an electrochemical potential by the virtue of intercalation is suitable for use in the disclosed method. For example, other potential crystals include, but are not limited to, $LiMnO_2$, $V_2O_5$, copper hexacyanoferrate and prussian blue derivatives thereof, iron phosphates, and intermetallic transition metal oxides.

In addition to the systems and methods described above, a desalination battery employing a new operational principle is disclosed herein. The desalination battery can move and store ions from the source water in appropriate electrodes (e.g. through intercalation and/or in liquid electrodes), and can recover stored energy as electric power while charging the ions onto the electrodes. A second desalination unit can complement the desalination battery to reduce total salt concentration to potable requirements of less than 500 parts per million (ppm), which is equivalent to a total dissolved solid (TDS) count not greater than 500 mg per liter. The second desalination unit can also allow some recovery of energy. A capacitive deionization unit may be employed as the second desalination unit, but electro dialysis, electro dialysis reversal, nano filtration, or low-pressure reverse osmosis (RO) unit may be employed instead.

Redox desalination works best with higher salinity waters (e.g. seawater). As the salinity concentration drops below about 10,000 to 15,000 parts per million (ppm), the efficiency of such a system decreases rapidly due to reduced solution conductivity. To push the salt concentration down to drinking water quality (<500 ppm), a separate, secondary brackish desalination system may be employed. For example, an electric approach such as capacitive deionization (CD) may be chosen for the secondary desalination, since it also can work as a battery by allowing the recovery of at least part of the energy required to remove the ions in the first place. Other known desalination systems useful for desalinating brackish water may be chosen for the secondary system.

The net energy consumption of the redox desalination system will be on par with, or slightly lower than, the state of the art in energy efficient seawater desalination, which is reverse osmosis (RO) that consumes 1-5 kWh/m$^3$ to generate potable water from sea water. An advantage of this complete system over RO is the low pressure operation, which reduces maintenance significantly and makes it accessible in places where specific equipment and maintenance personnel are not available.

Advantages over other electrical system are its ability to treat waters of high salinity, to increase the freshwater recovery ratio, and to reduce the total brine volume, as the ions can be discharged into brines with very high salt concentrations (up to the solubility limit). Another advantage of this system over other systems is the ability to recover the majority of the energy, making the present technology simultaneously a desalination technology and an energy storage technology, with reduced total capital expense. This feature can enable the net cost of desalinated water to be far lower than the state-of-the-art cost of $1/m$^3$ available today, by way of electricity arbitrage with load shifting services.

In one embodiment the system will be operated in batch mode, i.e. the volume of water to treat will be pushed into the redox desalination system. An electric potential is then applied to the electrodes and ions collected in the two electrodes until the salt concentration in the water drops below a set limit (e.g. 10,000 ppm). Then the water is pushed to the CD system, where a voltage is applied until the salt concentration has dropped below a second, lower limit (e.g. 500 ppm).

In another embodiment, water continuously flows through the system. The total residence time in each part is sufficient to achieve a desired reduction in salt concentration. To optimize performance further in such a continuous flow system, each unit can be broken up into different stages and/or components with independently controlled electrodes to accommodate decreasing salinity levels at each successive step during a desalination process, and/or to accommodate increasing salinity levels at each successive step during a salination process (during which water flows in the opposite direction of the water flow during the desalination process).

Figure 5:
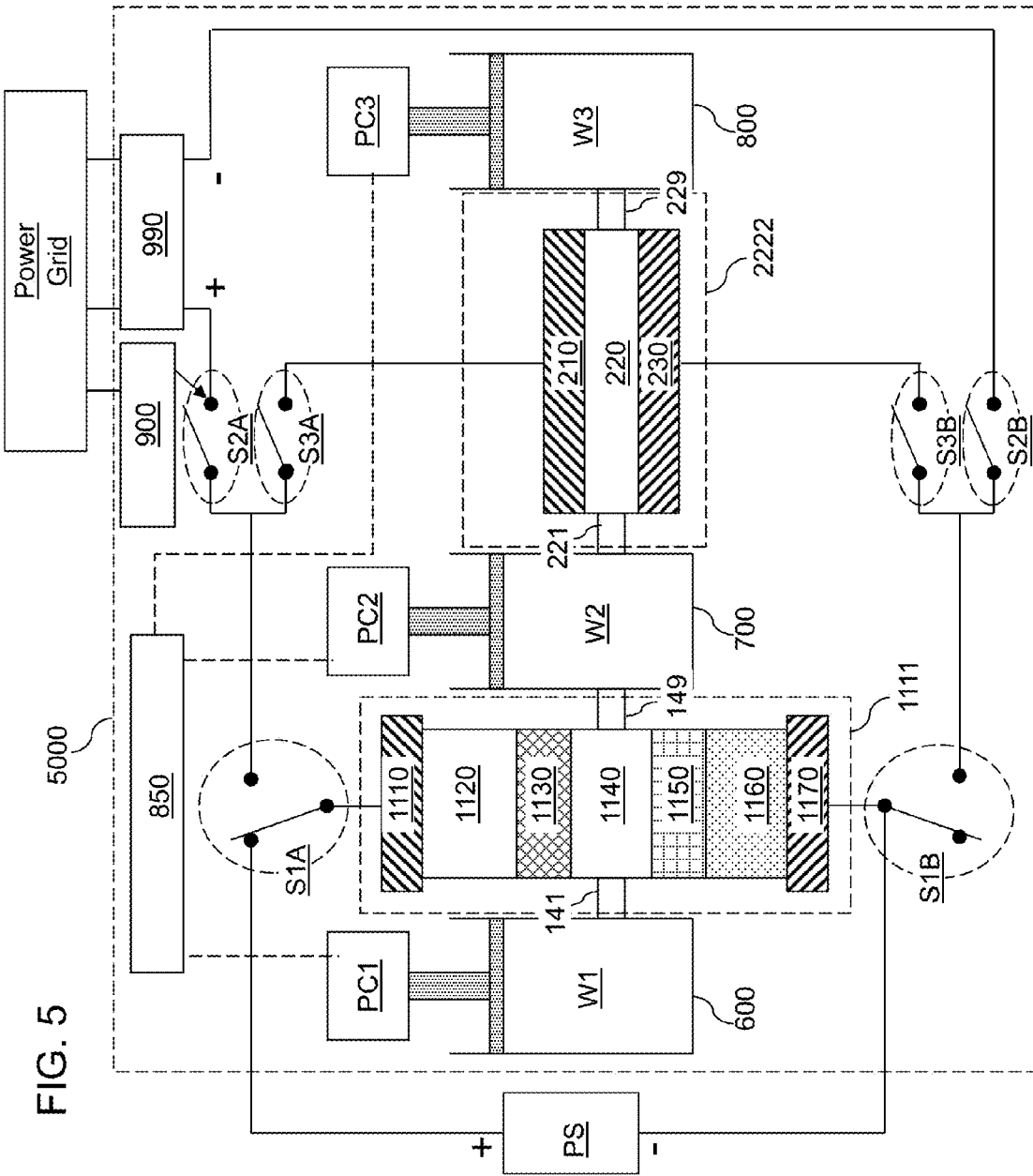
FIG. 5 is a schematic illustration of an exemplary energy storage device as coupled to a power supply unit and a power grid according to an embodiment of the present disclosure.
Figure 8:
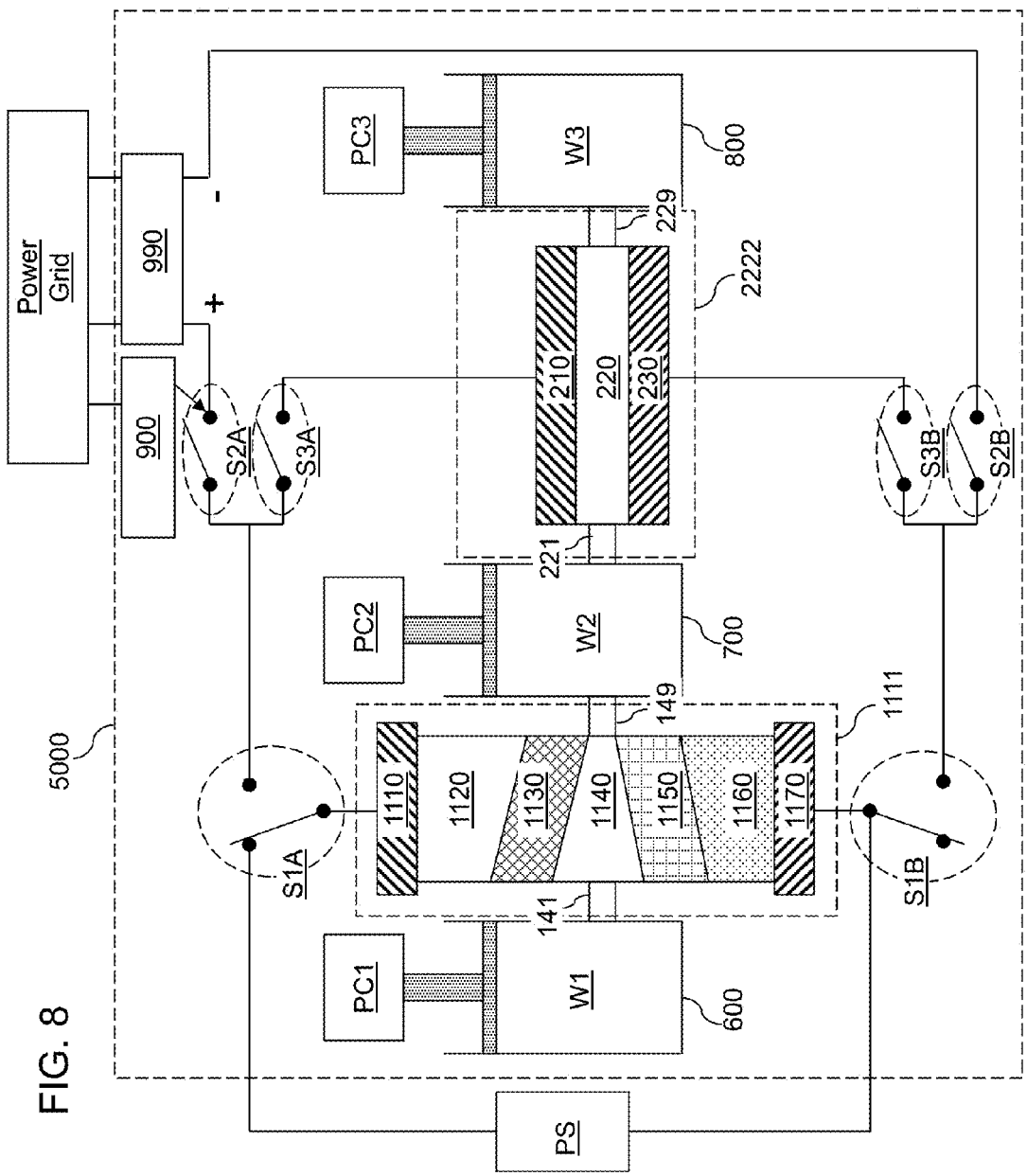
FIG. 8 is a schematic illustration of a first variation of the exemplary energy storage device as coupled to a power supply unit and a power grid according to an embodiment of the present disclosure.

Referring to FIG. 5, an exemplary energy storage system 5000 employing a reversible desalination-salination process is provided. The exemplary energy storage system 5000 includes an electrochemical desalination battery (EDB) unit 1111. A set of electrical switches (S1A, S1B, S2A, S2B, S3A, S3B) is provided within the exemplary energy storage system 5000 to provide a multi-configuration electrical connection that connects the various nodes of the exemplary energy storage system 5000 to a power supply unit PS (which can be either AC or DC according to various embodiments described herein, whether or not so stated) and/or to a power (e.g. electric) grid and/or other nodes of the exemplary energy storage system 5000. As used herein, an "electrical switch" refers to any device that is capable of altering electrical connections of a circuit. The set of electrical switches (S1A, S1B, S2A, S2B, S3A, S3B) constitutes an operational mode control device that controls the operational modes of the exemplary energy storage system 5000. As used herein, an "operational mode control device" refers to any device that can be employed to select an operational mode within a device configured to operate in two or more alternative operational modes. The operational mode control device is configured to select, among others, between a desalination mode and a salination mode based on presence or absence of power demand from a power grid and/or availability of external power as provided by a power supply unit PS for operation of the exemplary energy storage system 5000.

The EDB unit 1111 includes an anode (1110, 1120) and a cathode (1160, 1170), which can be embodied in various configurations. The anode (1110, 1120) is capable of accepting, and having a reversible redox reaction with, negative ions in water. The cathode (1160, 1170) is capable of accepting, and having a reversible redox reaction with, positive ions from water. In one embodiment, the anode (1110, 1120) can include a negative electrode plate 1110 and an optional electrolyte chamber 1120. In one embodiment, the cathode (1160, 1170) can include a positive electrode plate 1170 and an intercalation material portion 1160. The intercalation material portion 1160 is an optional component that is employed for battery chemistries that employs intercalation, and can be omitted for battery chemistries that does not employ intercalation. A water chamber 1140 is provide between the anode (1110, 1120) and the cathode (1160, 1170), and is filled with water to be salinated or desalinated.

The negative electrode plate 1110 includes a solid conductive material such as a first graphite plate. The positive electrode plate 1170 includes a solid conductive material such as a second graphite plate. An optional first ion exchange membrane 1130 can be provided between the water chamber 1140 and the anode (1110, 1120). In one embodiment, the first ion exchange membrane 1130 can be an anion exchange membrane (AEM) that allows passage of anions and does not allow passage of cations, or can be a negative-valence-selective membrane that allows passage of anions of greater negative charge while not allowing passage of anions of lesser negative charge or positive ions. In one embodiment, the first ion exchange membrane 1130 can be a semi-permeable membrane. An example of a material for the first ion exchange membrane is Fumasep® FAB (FuMA-Tech GmbH, Germany). An optional second ion exchange membrane 1150 may be provided between the water chamber 1140 and the cathode (1160, 1170). In one embodiment, the second ion exchange membrane 1150 can be a cation exchange membrane (CEM) that allows passage of cations and does not allow passage of anions, or can be a positive-valence-selective membrane that allows passage of cations of greater positive charge while not allowing passage of cations of lesser positive charge or negative ions. In one embodiment, the second ion exchange membrane 1130 can be a semi-permeable membrane. Negative-valence-selective membranes and positive-valence-selective membranes are herein collectively referred to as valence-selective membranes. The optional electrolyte chamber 1120, if present, can include an electrolyte material. The intercalation material portion 1160 can include an intercalation material such as $MnO_2$. Manganese oxide can assume several crystallographic forms, including $\alpha$ (alpha), $\beta$ (beta), $\gamma$ (gamma), $\delta$ (delta), and $\lambda$ (lambda). In one embodiment, the manganese oxide has a crystallographic form that maximizes intercalations, such as an alpha or delta form.

The general reaction for $Na^+$ intercalation into $MnO_2$ can be represented by the following reaction formula:

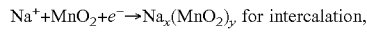
$Na^+ + MnO_2 + e^- \rightarrow Na_x(MnO_2)_y$ for intercalation, and

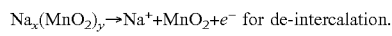
$Na_x(MnO_2)_y \rightarrow Na^+ + MnO_2 + e^-$ for de-intercalation.

The above reaction is pseudo-capacitive in nature, as it deals with fractional ionic charges.

It is generally accepted that $Na^+$ and $K^+$ can be reversibly intercalated and de-intercalated into and out of an appropriate $MnO_2$ matrix over a large number of cycles. This property is exploited in the present disclosure. Although certain crystallographic forms of $MnO_2$ are disclosed herein, it is to be understood that other embodiments may use other crystals for $Na^+$ and $K^+$ intercalation. In fact, any crystalline compound that can host Na or K ions under an electrochemical potential by the virtue of intercalation is suitable for use in the disclosed method. For example, other potential crystals include, but are not limited to, $LiMnO_2$, $V_2O_5$, copper hexacyanoferrate and similar prussian blue derivatives thereof, iron phosphates, and intermetallic transition metal oxides.

The EDB unit 1111 can be an electrochemical cell that can be employed for treatment of water, such as desalination or salination of water. In one embodiment, the anode (1110, 1120) can include at least one negative-ion redox electrode comprising reactants capable of storing a negative ion with a reversible redox reaction among the reactants.

In one embodiment, the electrolyte chamber 1120 of the anode (1110, 1120) can include a liquid including a material selected from cerium chloride (utilizing a change of ionic states between $Ce^{3+}$ and $Ce^{4+}$ states), germanium chloride (utilizing a change of ionic states between $Ge^{2+}$ and $Ge^{4+}$ states), vanadium chloride (utilizing a change of ionic states between $V^{2+}$ and $V^{3+}$ states), europium chloride (utilizing a change of ionic states between $Eu^{2+}$ and $Eu^{3+}$ states), and ferrous chloride (utilizing a change of ionic states between $Fe^{2+}$ and $Fe^{3+}$ states) as an electrolyte, and the intercalation material portion 1160 of the cathode (1160, 1170) can include copper hexacyanoferrate. In this embodiment, the abovementioned materials and/or combinations thereof can be chosen so as to minimize the cell potential and facilitate low-power desalination with a long cycle life.

In another embodiment, the anode (1110, 1120) can include a solid material selected from zinc, gallium, cerium, iron, copper, and gallium as the positive electrode plate 1110, and the cathode (1160, 1170) can include a compound selected from manganese oxide, copper hexacyanoferrate, prussian blue derivatives, vanadium pentoxide ($V_2O_5$), and sodium ferricyanide as the intercalation material portion 1160. In this embodiment, the abovementioned materials and/or combinations thereof can be chosen so as to maximize the cell potential to enhance energy storage in addition to desalination capability.

By way of non-limiting example only, in one embodiment, the EDB system may comprise a cerium chloride anode and copper hexacyanoferrate cathode, chosen so as to minimize the cell potential and facilitate low-power desalination with a long cycle life. As yet a further non-limiting embodiment, the EDB system may comprise a solid zinc anode and a copper hexacyanoferrate cathode, chosen so as to maximize the cell potential to enhance energy storage in addition to desalination capability.

The EDB unit 1111 may be configured for a continuous operation in which unprocessed water is continuously supplied on one side, and processed water is continuously extracted from another side. In this case, a first water tank 600 and a second water tank 700 may be connected to the water chamber 1140. In this case, the first water tank 600 can be connected to the water chamber 1140 through a first water port 141, and the second water tank 700 can be connected to the water chamber 1140 through a second water port 149. The first water tank 600 can contain first-type water W1 having a first level of salinity, and the second water tank 700 can contain second-type water W2 having a second level of salinity. The pressure of the first-type water W1 can be controlled by a first pressure controller PC1, which can apply pressure on the first-type water W1. The pressure of the second-type water W2 can be controlled by a second pressure controller PC2, which can apply pressure on the second-type water W2. Alternatively, water pumps (not shown) that push the water from respective water tanks into the EDB unit at a desired flow rate may be employed in lieu of pressure controllers (PC1, PC2). The first-type water W1 has a higher total dissolved solid (TDS) count than the second-type water W2. The ratio of the TDS count of the first-type water W1 to the TDS count of the second-type water W2 may, by way of example only, be in a range from about 1.5 to about 10, and can be in any of the ranges such as from about 1.5 to about 2.5, from about 2.0 to about 3.5, from about 3.0 to about 5.0, from about 4.0 to about 7.0, and from about 5.0 to about 10, and any combinations of upper and lower ranges therebetween, although lesser and greater ratios can also be employed.

The direction of water flow between the first water tank 600 and the second water tank 700 is selected depending on whether the EDB unit 1111 operates in a salination mode or in a desalination mode. The EDB unit 1111 can alternately operate in the desalination mode in which ions are removed from the water in the water chamber 1140 and accumulate in the anode (1110, 1120) and the cathode (1160, 1170) while supplying power to an electrical load, and in the salination mode in which ions dissociate from ionic compounds accumulated in the anode (1110, 1120) and the cathode (1160, 1170) while storing energy provided from the power supply unit PS of the EDB unit 1111.

The operation of the EDB unit 1111 in the desalination mode is illustrated in FIG. 6A. During operation of the EDB unit 1111 in the desalination mode, the water flow within the EDB unit 1111 proceeds from the first water tank 600 to the second water tank 700, i.e., from the direction of the first-type water W1 having a higher salinity to the second-type water W2 having a lower salinity. In one embodiment, during operation of the EDB unit 1111 in the desalination mode, the first-type water W1 can be sea water having a TDS count of about 35,000 mg per liter, and the second-type water W2 can be brackish water having a TDS count in a range from about 3,500 mg per liter to about 20,000 mg per liter, although different TDS ranges can also be employed. The transport of the water from the first water tank 600 to the second water tank 700 can be effected by setting the pressure on the first-type water W1, as applied by the first pressure controller P1, to be greater than the pressure on the second-type water W2, which is regulated by the second pressure controller P2.

The operation of the EDB unit 1111 in the salination mode is illustrated in FIG. 6B. During operation of the EDB unit 1111 in the salination mode, the water flow within the EDB unit 1111 proceeds from the second water tank 700 to the first water tank 600, i.e., from the direction of the second-type water W2 having a lower salinity to the first-type water W1 having a higher salinity. In one embodiment, during operation of the EDB unit 1111 in the salination mode, the second-type water W2 can be brackish water, sea water, or brine having a TDS count in a range from about 10,000 mg per liter to about 100,000 mg per liter, and the first-type water W1 can be brackish water, sea water, or brine have a higher TDS count in a range from about 20,000 mg per liter to about 300,000 mg per liter, although different TDS ranges can also be employed. The transport of the water from the second water tank 700 to the first water tank 600 can be effected by setting the pressure on the second-type water W2, as applied by the second pressure controller P2, to be greater than the pressure on the first-type water W1, which is regulated by the first pressure controller P1.

Referring back to FIG. 5, the set of electrical switches includes a first set of electrical switches (S1A, S1B) that controls electrical connection of the anode (1110, 1120) and the cathode (1160, 1170) of the exemplary energy storage system to other electrical nodes. During operation in the salination mode, the first set of electrical switches (S1A, S1B) can connect the anode (1110, 1120) to a positive output voltage node of a DC power supply unit, i.e., the power supply unit PS, and can connect the cathode (1160, 1170) to a negative output voltage node of the DC power supply unit, respectively. As used herein, "DC power supply unit" refers to a power supply unit that provides DC power, i.e., direct current power that does not change polarity as a function of time. Ions are released from the anode (1110, 1120) and the cathode (1160, 1170) to salinate the water in the water chamber 1140, and energy is stored in the EDB unit 1111 in the salination mode. In one embodiment, anions can be released from ionic compounds that are formed on a solid material (such as the positive electrode plate 1110) during a previous desalination mode operation, and cations can be released from ionic compounds that are formed on the intercalation material portion 1160 during the previous desalination mode operation.

During operation in the desalination mode, the first set of electrical switches (S1A, S1B) can connect the anode (1110, 1120) to a positive electrode of an electrical load, and can connect the cathode (1160, 1170) to a negative electrode of the electrical load, respectively. The EDB unit 1111 desalinates water in the water chamber 1140 while releasing stored energy as output power employing the anode (1110, 1120) as a positive output electrode and the cathode (1160, 1170) as a negative output electrode in the desalination mode. As used herein, "DC output power" refers to output power provided in the form of direct current, i.e., output power that does not change polarity as a function of time.

The electrical load can include the power grid. A second set of switches (S2A, S2B) can be employed to connect the anode (1110, 1120) and the cathode (1160, 1170) of the EDB unit 1111 to an inverter 990. The inverter 990 converts the DC output of the EDB unit 1111 to an AC power output with a matching amplitude (i.e., the same amplitude as the amplitude of the AC voltage of the power grid) and a synchronous phase to feed into the power grid. Thus, the power released from the EDB unit 1111 during the desalination mode can be transmitted to the power grid through the first and second sets of switches (S1A, S1B, S2A, S2B) and the inverter 990. The inverter 990 can be provided as part of the exemplary energy storage system 5000, or can be provided externally on the side of the power grid. In one embodiment, the second set of switches (S2A, S2B) can be controlled by a power grid load monitor 900, which monitors the total power load on the power grid, and connects the second set of switches (S2A, S2B) with the inverter 990 only at, or near, the peak power demand on the power grid.

In one embodiment, the exemplary energy storage system 5000 can further include a capacitive deionization (CD) unit 2222. The CD unit 2222 can include a first electrode 210, a second electrode 230, and a water flow region 220 located between the first and second electrodes (210, 230). In one embodiment, the CD unit 2222 can perform a second desalination process while the EDB unit 1111 operates in the desalination mode, and can perform a salination process while the EDB unit 1111 operates in the salination mode.

The CD unit 2222 can have a water port (herein referred to as a third water port 221) that is connected to water having a higher TDS count, and another water port (herein referred to as a fourth water port 229) that is connected to water having a lower TDS count. For example, the water having the higher TDS count can be the second-type water W2 contained within the second water tank 700, and the water having the lower TDS count can be a third-type water W3 contained within a third water tank 800. The pressure of the second-type water W2 can be controlled by a second pressure controller PC2, which can apply pressure on the second-type water W2 as needed. The pressure of the third-type water W3 in the third water tank 800 can be regulated by a third pressure controller PC3, which can apply pressure on the third-type water as needed. Alternatively, water pumps (not shown) that push the water from respective water tanks into the EDB unit at a desired flow rate may be employed in lieu of pressure controllers (PC1, PC2).

The second-type water W2 can have the second level of salinity as discussed above. The third-type water W3 can have a third level of salinity, which is lower than the second level of salinity. In other words, the second-type water W2 has a higher TDS count than the third-type water W3. The TDS count of the third-type water W3 can be less than about 500 mg per liter, although a higher TDS count can also be employed.

The direction of water flow between the second water tank 700 and the third water tank 800 is selected depending on whether the CD unit 2222 operates in a salination mode or in a desalination mode. The CD unit 2222 can alternately operate in the desalination mode in which ions are removed from the water in the water flow region 220 and accumulate on the first electrode 210 and the second electrode 230 while consuming power supplied to the CD unit 2222, and in the salination mode in which ions dissociate from the ionic compounds accumulated on the first electrode 210 and the second electrode 230 while releasing energy stored in the CD unit 2222.

The operation of the EDB unit 1111 in the desalination mode is illustrated in FIG. 7A. During operation of the CD unit 2222 in the desalination mode, the water flow within the CD unit 2222 proceeds from the second water tank 700 to the third water tank 800, i.e., from the direction of the second-type water W2 having a higher salinity to the third-type water W3 having a lower salinity. In one embodiment, during operation of the CD unit 2222 in the desalination mode, the second-type water W2 can be brackish water having a TDS count in a range from about 3,500 mg per liter to about 20,000 mg per liter, and the third-type water W3 can be potable water having a TDS count not greater than about 500 mg per liter, although a higher TDS count for the third-type water W3 can also be employed. The transport of the water from the second water tank 700 to the third water tank 800 can be effected by setting the pressure on the second-type water W2, as applied by the second pressure controller P2, to be greater than the pressure on the third-type water W3, which is regulated by the third pressure controller P3.

The operation of the CD unit 2222 in the salination mode is illustrated in FIG. 7B. During operation of the CD unit 2222 in the salination mode, the water flow within the CD unit 2222 proceeds from the third water tank 800 to the second water tank 700, i.e., from the direction of the third-type water W3 having a lower salinity to the second-type water W2 having a higher salinity. In one embodiment, during operation of the CD unit 2222 in the salination mode, the third-type water W3 can be potable water or brackish water having a TDS count in a range from about 10 mg per liter to about 30,000 mg per liter (such as from about 500 mg per liter to about 10,000 mg per liter), and the second-type water W2 can be brackish water, sea water, or brine having a TDS count in a range from about 10,000 mg per liter to about 100,000 mg per liter, although different TDS ranges can also be employed. The transport of the water from the third water tank 800 to the second water tank 700 can be effected by setting the pressure on the third-type water W3, as applied by the third pressure controller P3, to be greater than the pressure on the second-type water W2, which is regulated by the second pressure controller P2.

Referring back to FIG. 5, during operation of the CD unit 2222 in the desalination mode, at least a fraction of the output power generated from the EDB unit 1111 can be applied across the first and second electrodes (210, 230) of the CD unit 2222 to provide power input for the operation of the CD unit 2222. The routing of a fraction of the output power generated from the EDB unit 1111 to the CD unit 2222 can be effected by a third set of electrical switches (S3A, S3B), which can be connected in a parallel connection with respect to the power grid and the second set of electrical switches (S2A, S2B). The power input required to operate the CD unit 2222 is typically a small fraction of the power stored in the EDB unit 1111 when a comparable volume of water passes through the EDB unit 1111 and the CD unit 2222. Thus, the energy stored in the EDB unit 1111 during the operation of the EDB unit 1111 in the salination mode (in which both the EDB unit 1111 and the CD unit 2222 runs respective salination processes) can be more than sufficient to operate the CD unit 2222 in the desalination mode (in which both the EDB unit 1111 and the CD unit 2222 runs respective desalination processes). Therefore, by routing a fraction of the energy released from the EDB unit 1111 to the CD unit 2222 through the third set of switches (S3A, S3B), the CD unit 2222 can be adequately powered, and additional power can be released from the EDB unit to the power grid during the desalination mode.

A process control device 850 can be provided to control the operational modes of the various components of the exemplary energy storage system. The process control device 850 can include a water flow control device as a component therein. The water flow control device controls the pressures of the first-type water W1, the second-type water W2, and/or the third-type water W3 through the first, second, and/or third pressure control devices (PC1, PC2, PC3) or through water pumps (not shown). The water flow control device may be configured to induce flow of water in different directions between the desalination mode and the salination mode in the manner described above. Specifically, the water flow control device can induce water to flow from the EDB unit 1111 to the CD unit 2222 during the desalination mode, and can induce water to flow from the CD unit 2222 to the EDB unit 1111 or from the EDB unit 1111 to the CD unit 2222 during the salination mode.

In one embodiment, the combination of the EDB unit 1111 and the CD unit 2222 can be configured to provide water having a total dissolved solid (TDS) count not greater than about 500 mg per liter in the desalination mode.

Figure 4:
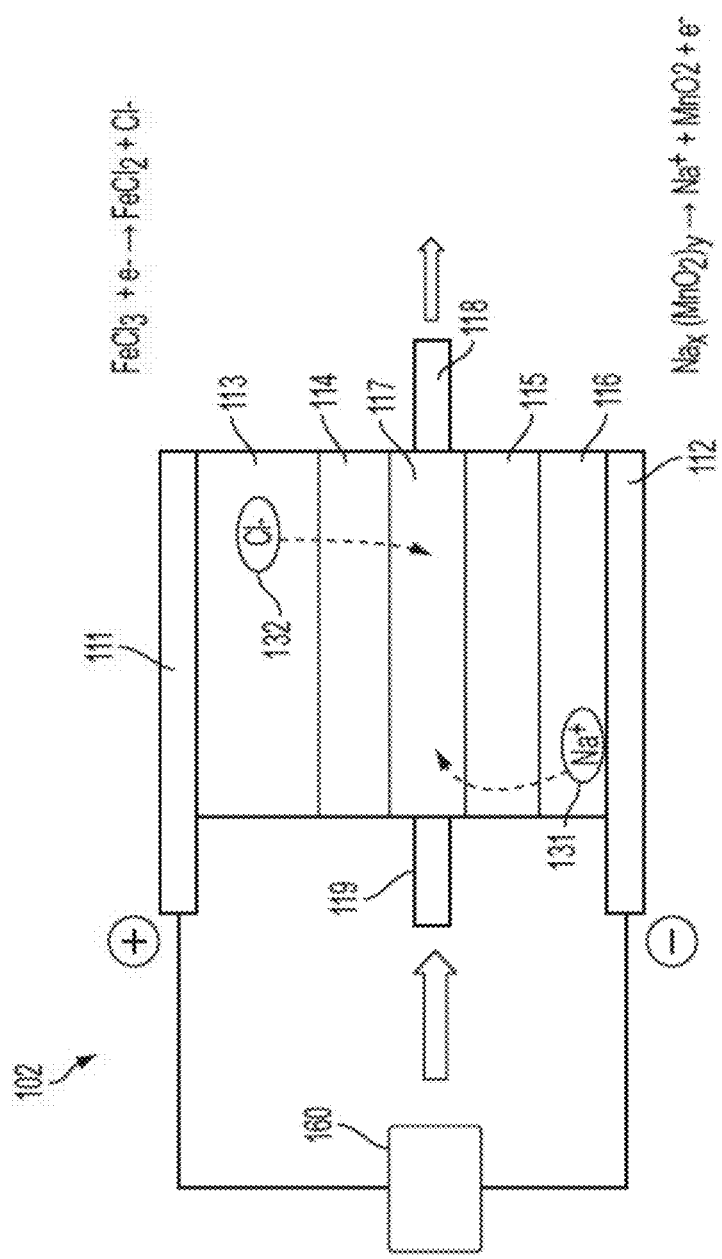
FIG. 4 is a representation of the disclosed desalination device in a concentration (discharging) mode.

Referring to FIG. 4, a first variation of the exemplary energy storage system 5000 is illustrated, in which the separation distance between the anode (1110, 1120) and the cathode (1160, 1170) decreases along a direction of water flow during the desalination mode. Desalination is driven by ion diffusion in the EDB unit 1111. When the salt concentration decreases, it takes longer for the ions to reach the electrodes (i.e., the anode and the cathode), effectively increasing the cell resistance. Reducing the electrode distance at a rate that keeps the internal resistance substantially constant leads to an energy-efficient desalination process, as well as energy-efficient recharging during the salination process. In one embodiment, the separation distance between the anode (1110, 1120) and the cathode (1160, 1170) can be roughly inversely proportional to the concentration of ions as the water in treatment passes through the water chamber 1140 either in the desalination mode or in the salination mode.

In one embodiment, the electrical load can comprise a power grid powered at least in part by the EDB unit 1111.

In one embodiment, the cathode (1160, 1170) can be immersed in the water chamber 1140 or separated from the water chamber containing water under treatment by a porous separator, i.e., the second ion exchange membrane 1150. The EDB unit 1111 can include an anion exchange membrane 1130 separating the anode from the water chamber 1140.

In one embodiment, the water in the EDB unit 1111 can be configured to reduce a total dissolved salt count in processed water by at least about 50% during the desalination mode, and can be configured to at least approximately double a total dissolved salt count in processed water during the salination mode.

Figure 9:
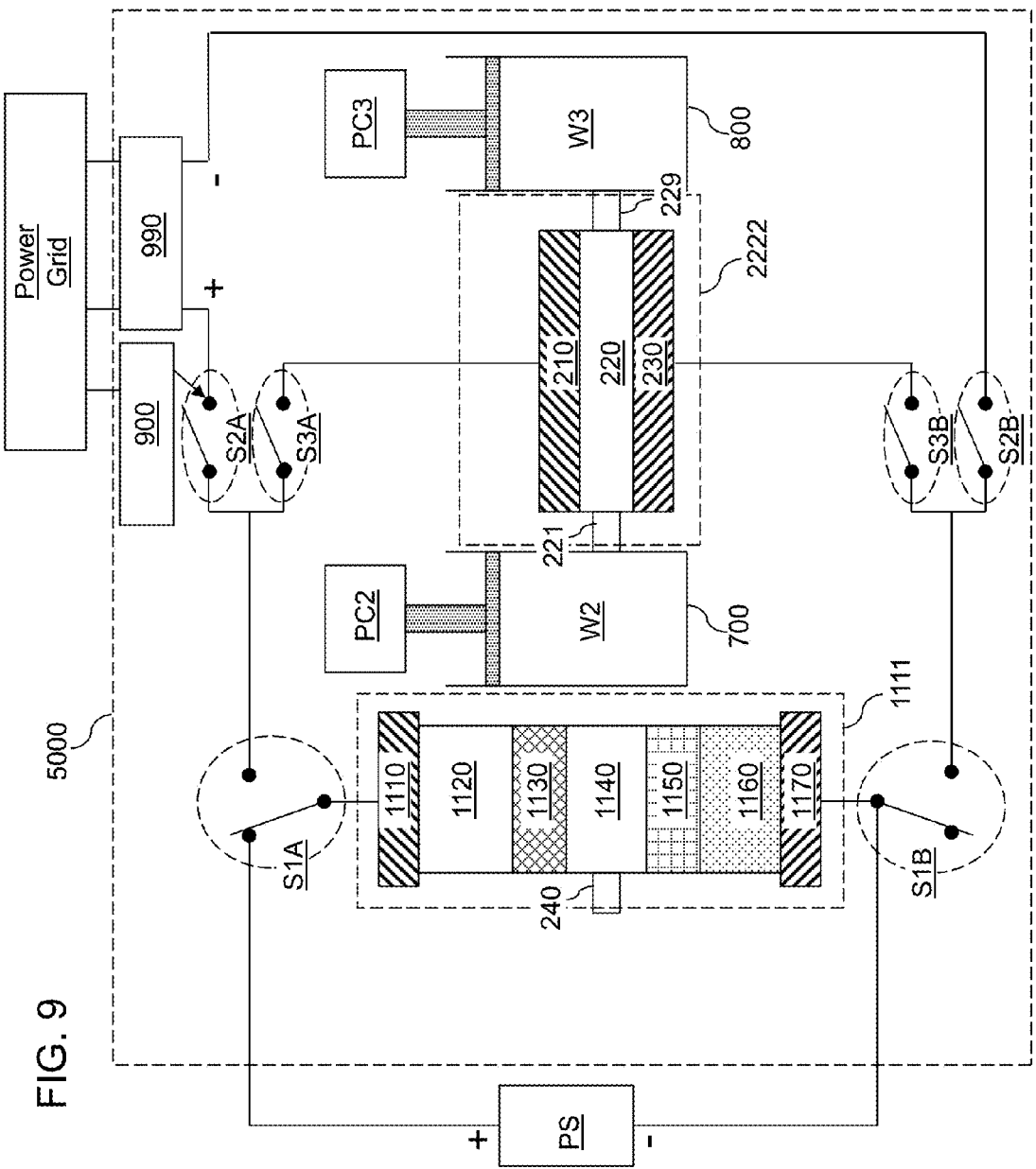
FIG. 9 is a schematic illustration of a second variation of the exemplary energy storage device as coupled to a power supply unit and a power grid according to an embodiment of the present disclosure.

Referring to FIG. 9, a second variation of the exemplary energy storage system 5000 is illustrated, which differs from the exemplary energy storage system of FIG. 5 by use of a batch processing in the EDB unit 1111 instead of continuous processing. In this case, water contained in the water chamber 1140 is processed within the EDB unit 1111 in a desalination process or in a salination process. A water port 240 can be provided to allow transport of unprocessed water into the water chamber 1140, and transport of processed water out of the water chamber 1140. Alternatively, a water inlet port and a water outlet port can be employed in lieu of a single water port 240. In the desalination mode operation, the unprocessed water is equivalent to the first-type water W1 and the processed water is equivalent to the second-type water W2. In the salination mode operation, the unprocessed water is equivalent to the second-type water W2, and the processed water is equivalent to the first-type water W1.

Figure 10:
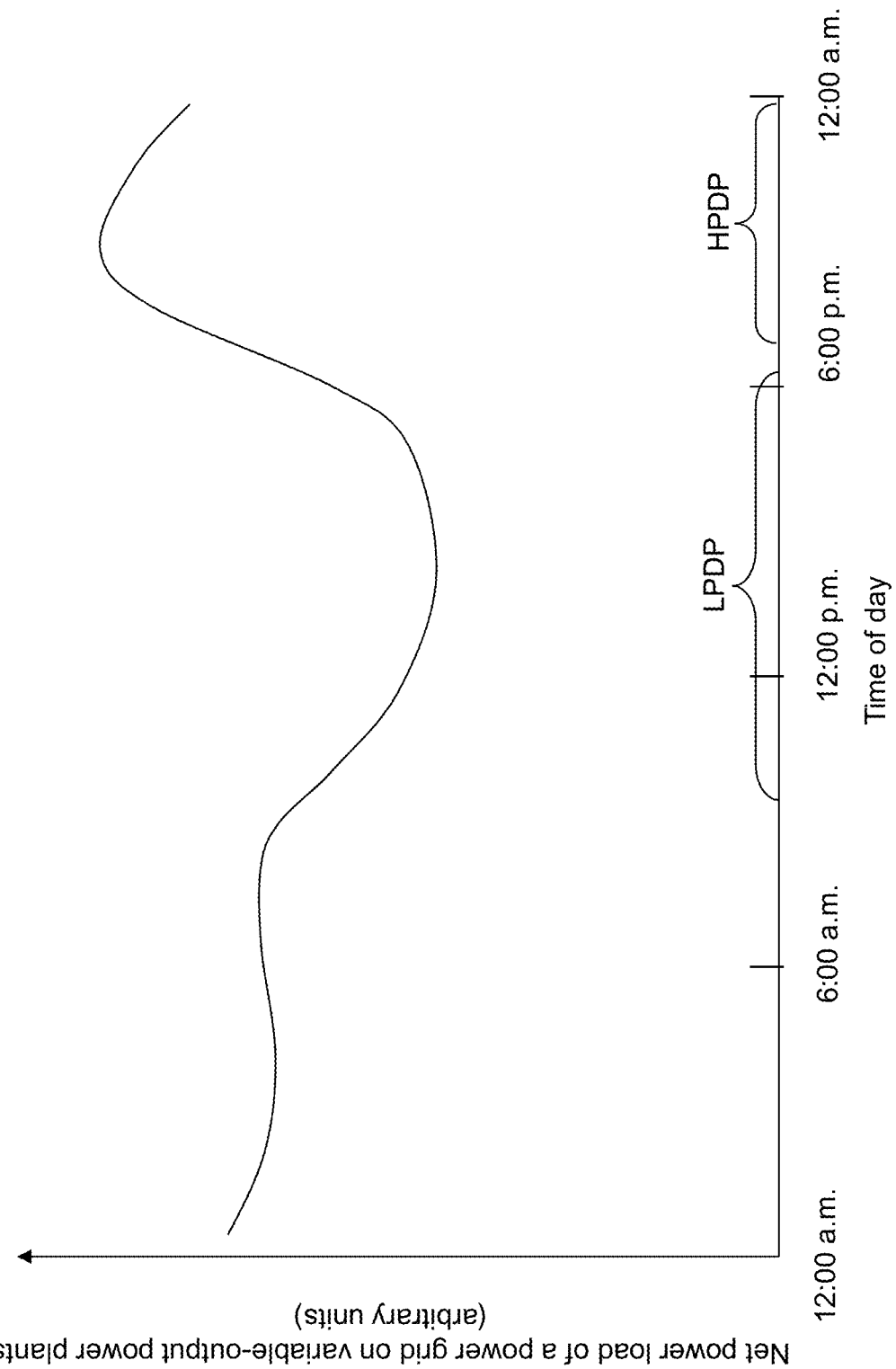
FIG. 10 illustrates a hypothetical net power demand curve for an exemplary power grid, in which a lower power demand period and a high power demand period are identified.

Referring to FIG. 10, a hypothetical net power demand curve is illustrated for an exemplary power grid, in which a lower power demand period LPDP and a high power demand period HPDP are identified. The hypothetical net power demand curve is for a 24 hour period. The net power demand curve plots the total power demand less power supplied by power sources that do not have controllable output (such as solar power plants or wind power plants). The net power demand curve shows the energy that variable output power plants (i.e. conventional fossil or nuclear fuel power plants) have to supply during the given time period. The deepening dip during day hours reflects the increasing use of solar systems in this time period. The total power demand peaks early in the evening, when the power supply from renewable power sources (such as solar power supplied to the grid) is no longer available. Thus, the net power demand curve has a peak in the evening, and has a valley during the day.

The lower power demand period LPDP can correspond to a time period in which solar power plants generate power HPDP and contribute power to the power grid. The high power demand period HPDP can correspond to a time period in the evening. As more solar power plants are expected to be built to supply power to the power grid, the valley in the net power demand curves is expected to become deeper in the future. The net power demand curve thus represents the power that variable output power generators (such as a fossil fuel burning power plant) need to supply to the power grid. Since the power grid needs to supply the total power in demand to avoid a brownout or a blackout, the capacity of the variable power output power generators must be set such that the variable power output power generators must be able to provide the peak power demand in the net power demand curve.

According to an embodiment of the present disclosure, the energy storage system of the present disclosure can be employed to utilize the excess capacity of the power sources (as calculated by the combined output power of the renewable energy power sources and the variable output power generators such as fossil fuel burning power generators) during the lower power demand period LPDP to run a salination process, thereby storing energy in the energy storage system. During the high power demand period HPDP, the energy storage system of the present disclosure can release energy while running a desalination process. The added power to the grid, as released from the energy storage system of the present disclosure, reduces the required power contribution from the variable output power generators. Thus, by employing the energy storage system of the present disclosure, the peak power demand from the variable output power generators can be reduced, and less variable output power generators can be employed to meet the total power demand of the power grid.

Figure 11:
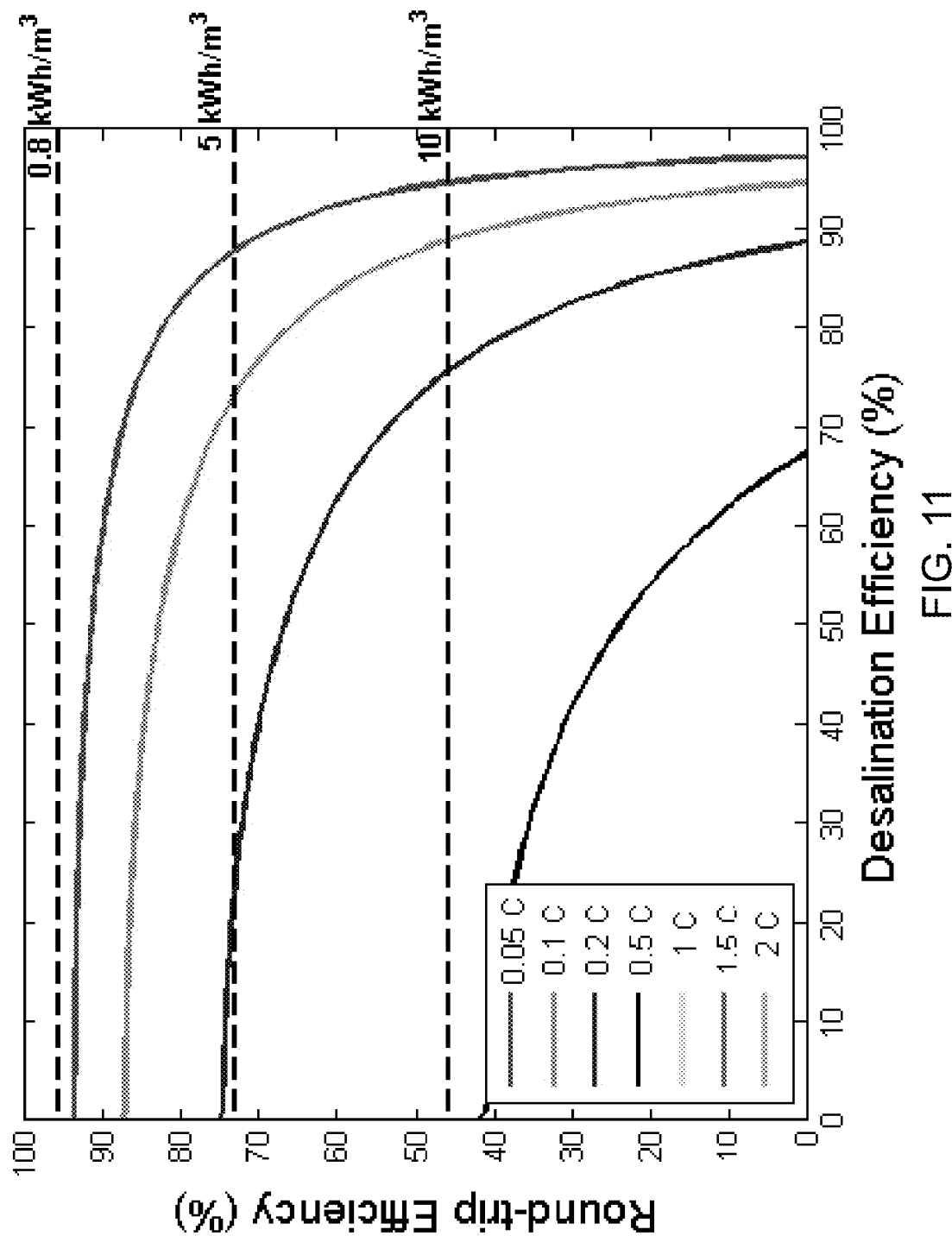
FIG. 11 illustrates estimated desalination efficiency vs. energy recovery efficiency for an exemplary desalination battery.

FIG. 11 illustrates estimated desalination efficiency vs. energy recovery efficiency for an exemplary desalination battery. The different curves are for different desalination rates. The desalination rate is measured by C rate, which is the inverse of one hour. For example, a curve labeled 2C completes the desalination process in ½ hour, while a curve labeled 0.2C completes the desalination process in 5 hours. Battery efficiency is reduced for a faster desalination process, i.e., for a higher C rate. Battery efficiency is represented as a round-trip efficiency, which is the ratio of the power output from the battery to the power input to the battery. Battery efficiency is reduced for more complete desalination of the water, i.e., for a higher desalination efficiency. The desalination efficiency is calculated as the ratio of the amount of removed salt to the total amount of salt in the incoming water, i.e., the total dissolved solid count. Depending on the application, systems can be optimized for high battery performance or high desalination efficiency.

Individual components of the various systems of the embodiments of the present disclosure may be employed as a standalone device, or in conjunction with any arbitrary subset of other components in the same system or with any other compatible components in any of the systems described above. Further, the systems of the present disclosure may be employed primarily for treatment of water with optional energy storage usage, primarily for energy storage with optional water treatment usage, or for treatment of water and energy storage with emphasis being shifted between the two functions from time to time, or with predetermined level of emphasis on each function.

In one embodiment of the present disclosure, each of the electrochemical batteries or electrochemical desalination battery described herein can be employed to provide a system for treatment of water and optional energy storage. The system includes at least an electrochemical desalination battery (EDB) unit 1111, which includes at least one water chamber 1140 configured to hold water to be treated; at least one negative-ion redox electrode (embodied as the anode (1110, 1120)) comprising a solution of an electrolyte material selected from cerium chloride, germanium chloride, vanadium chloride, europium chloride, and ferrous chloride, and capable of accepting, and having a reversible redox reaction with, at least one negative ion in the water; at least one positive-ion redox electrode (which is a cathode (1160, 1170)) capable of accepting, and having a reversible redox reaction with, at least one positive ion in the water. The positive-ion redox electrode is immersed in the water chamber or separated from the water chamber by an optional porous separator. The cathode (1160, 1170) can employ an intercalation chemistry, or can form an insoluble product with positive ions from water, and is immersed in the water chamber 1140 or is separated from the water chamber using a porous separator (that may be located on the intercalation material portion 1160). The EDB unit 1111 can further include an anion exchange membrane 1130 separating the at least one negative-ion redox electrode (1110, 1120) from the water chamber 1140.

The system can optionally include a capacitive deionization (CD) unit 2222 connected to the EDB unit 1111 via a water port as described above. In one embodiment, the CD unit 2222 can perform a desalination process while the EDB unit 1111 operates in the desalination mode, and perform a salination process while the EDB unit 1111 operates in the salination mode. The combination of the EDB unit 1111 and the CD unit 2222 can be configured to generate water having a total dissolved solid (TDS) count not greater than about 500 mg per liter in the desalination mode. In some embodiments, a separation distance between the anion exchange membrane 1120 and the at least one positive-ion redox electrode (1160, 1170) can decrease along a direction of water flow during the desalination mode.

In one embodiment of the present disclosure, any system for treatment of water and optional energy storage of the present disclosure can be employed to desalinate water. In this case, water having a first salinity (e.g., at sea water level) can be transported into the at least one water chamber 1140. The water having the first salinity can be desalinated to provide water having a second salinity (e.g., having a TDS count in a range from 3,000 mg per liter to 10,000 mg per liter) that is lower than the first salinity employing the EDB unit 1111. The water having the second salinity can be subsequently removed from the EDB unit 1111. The supply and extraction of water from the EDB unit 1111 can be performed continuously, or can be performed in batches.

The water having the second salinity can be transported into a capacitive deionization (CD) unit 2222. The water transported into the CD unit 2222 can be desalinated to provide water having a third salinity (e.g., having a TDS count less than 500 mg per liter) that is lower than the second salinity.

Flow of water can be induced in different directions between the desalination mode and the salination mode employing a water flow control device. The water flow control device can induce water to flow from the EDB unit 1111 to the CD unit 2222 during the desalination mode, and induce water to flow from the CD unit 2222 to the EDB unit 1111 during the salination mode.

The system can be employed to store and release energy concurrently with providing water treatment. In the salination mode, the at least one negative-ion redox electrode (1110, 1120) can be connected to a positive output voltage node of a DC power supply unit, and the at least one positive-ion redox electrode (1160, 1170) can be connected to a negative output voltage node of the DC power supply unit, respectively. In the salination mode, ions are released from the at least one negative-ion redox electrode (1110, 1120) and the at least one positive-ion redox electrode (1160, 1170) and energy is stored in the EDB unit 1111. In the desalination mode, the at least one negative-ion redox electrode (1110, 1120) is connected to a positive electrode of an electrical load, and the at least one positive-ion redox electrode (1160, 1170) is connected to a negative electrode of the electrical load, respectively. In the desalination mode, the EDB unit 1111 desalinates water therein while releasing stored energy as output power employing the at least one negative-ion redox electrode (1110, 1120) as a positive output electrode and the at least one positive-ion redox electrode (1160, 1170) as a negative output electrode.

The electrical load can comprise a power grid to which the EDB unit 1111 supplies electrical power through an inverter 990. The EDB unit 1111 can be operated in the desalination mode when power demand from the power grid is present, and can be operated in the salination mode when power demand from the power grid is absent, for example, due to additional power supply to the power grid provided by a time-dependent power source (such as a solar power source).

In one embodiment, a system of the present disclosure can be employed for treatment of water and energy storage. The system can include an electrochemical desalination battery (EDB) unit 1111 comprising an anode (1110, 1120) and a cathode (1160, 1170). The anode (1110, 1120) is capable of accepting, and having a reversible redox reaction with, negative ions in water, and the cathode (1160, 1170) is capable of accepting, and having a reversible redox reaction with, positive ions from water. Any of the EDB units 1000 or electrochemical batteries of the present disclosure can be employed in this system. The system can further include a capacitive deionization (CD) unit 2222 comprising a first electrode 210, a second electrode 230, and a water flow region 220 located between the first and second electrodes (210, 230). The water flow control device to induce flow of water in different directions between a desalination mode and a salination mode. The water flow control device can be a component within a process control device 850. The water flow control device induces water to flow from the EDB unit 1111 to the CD unit 2222 during the desalination mode, and the water flow control device induces water to flow from the CD unit 2222 to the EDB unit 1111 during the salination mode. The CD unit 2222 can perform a desalination process while the EDB unit 1111 operates in the desalination mode to desalinate water therein, and can perform a salination process while the EDB unit 1111 operates in the salination mode to salinate water therein.

The present disclosure is further illustrated by the following non-limiting examples, which are intended to be purely exemplary of the disclosure.

EXEMPLARY EMBODIMENTS

Non-limiting examples of the components of the energy storage system of the present disclosure can be implemented employing the following features.

Electrode materials for desalination battery can be selected to simultaneously provide energy storage and a salination-desalination process.

Liquid electrodes can be employed to change of oxidation level of at least one constituent ion. Examples include the ferricyanide and cerium ions which work in the following manner

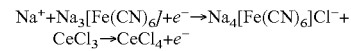

Ions are incorporated within the crystal lattice of the intercalation materials, resulting in an expansion of the lattice parameters employing a reaction such as:

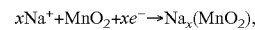

wherein x is a fractional number between 0 and 1.

In some embodiments, a bulk material can be dissolved and re-deposited on electrodes. For example, a metal anode can dissolve to form soluble chlorides (e.g., $ZnCl_2$).

In some embodiments, ions may form an insoluble metal salt on the surface of an electrode employing a surface chemistry such as:

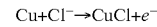

In some embodiments, the materials in the EDB unit can be optimized for high desalination output at a low voltage operation. Materials selected for such a low voltage operation provide a low open circuit potential (at zero current). The low cell potential allows such chemistries to desalinate water with significantly lower energy and power input. An exemplary combination of electrode materials includes:

| cathode | anode |
| --- | --- |
| copper hexacyanoferrate | cerium (III/IV) chloride |

In some embodiments, the materials in the EDB unit can be optimized for battery efficiency at a high voltage operation. In contrast to the low voltage chemistries, certain battery chemistries (e.g., $Zn/MnO_2$, Zn/Cu HCF), can provide an intrinsically high cell potential, which allows for significant energy storage capability. The energy stored during the charge step can then be utilized during the discharge step, providing dual capabilities of energy storage, as well as desalination. Exemplary combinations of electrode materials include:

| cathode | anode |
| --- | --- |
| manganese (IV) dioxide | zinc |
| copper hexacyanoferrate | gallium |
| sodium ferricyanide | |

In some embodiment, high cycle life materials can be employed for the battery chemistry. Such batteries can be based on highly reversible redox couples which can have virtually infinite cycle lives. For example, anode can employ the redox chemistry of Ce4+/3+ or Fe2+/3+, and the cathode can employ ferricyanide. Such a system can be particularly useful in applications requiring long cycle life to offset the installation cost.

| cathode | anode |
|---|---|
| sodium ferricyanide | cerium (III/IV) iron (II/III) gallium (VIII) |

The energy storage system of the present disclosure can employ various modes of operation, and can be provided in various configurations. In one embodiment, a single system can be provided. The energy storage system can employ a batch process to treat a fixed volume of water in a desalination mode operation, and then be used as a battery in a salination mode operation. The desalination mode operation and salination mode operation can be repeated. Alternatively, the energy storage system can be operated in a continuous process in which water flows through the system for desalination in the desalination mode, and water is flowed through the system for battery operation in the salination mode.

Alternatively, multiple energy storage systems can be operated in a manner that cycles through the desalination mode and the salination mode out of phase among one another. In one embodiment, at least one energy storage system runs in the desalination mode, and at least another one can run in the battery mode in such tandem energy storage systems. In one embodiment, the phases of the units of the multiple energy storage system can be selected to maximize power consumption during a low power demand period, and maximizes power release to the power grid during a high power demand period.

While a capacitive deionization (CD) unit is employed as a second stage deionization unit in the examples illustrated herein, any method capable of lowering the salinity below a potability limit of salination (e.g., below 500 mg per liter) can be employed in lieu of the CD unit and in combination of any of the examples for the EDB unit. Examples include but are not limited to ED, EDR, low-pressure RO, and nano filtration (NF).

EXAMPLES

Example 1. Electrochemical Cell for Desalination

Ferrous-Ferric Chloride Redox Reaction:
A 0.1M aqueous solution of ferrous chloride in 0.1M HCl was oxidized to ferric chloride with a chloride ion ($Cl^-$) diffused through a membrane under the influence of an electric potential. The ferric chloride was reduced to ferrous chloride solution in an energetically-favored way by giving up the $Cl^-$ ion, which diffused through the membrane.

Anion Exchange Membrane:
An anion exchange membrane Fumasep® FAB (FuMA-Tech GmbH, Germany), which has an anionic selectivity of over 96%, has an electrical resistance of less than 1 $\Omega/cm_2$, is stable in pH ranges from 0-13, and is about 0.1 mm in thickness, was used.

Preparation of Alpha-$MnO_2$:
A laboratory scale amount of alpha form of $MnO_2$ ("Alpha-MnO2") was prepared as follows. It is noted that high volume production of Alpha-$MnO_2$ can be accomplished using other industrial processes. 200 ml of 0.1M $KMnO_4$ and 200 ml of 0.15M $MnSO_4.H_2O$ were prepared and individually heated to 30° C. The $KMnO_4$ solution was placed in a beaker and stirred in an ultrasonic bath. The $MnSO_4$ solution was added drop wise into the $KMnO_4$ solution. A brown precipitate appeared. The precipitation continued until all of the $MnSO_4$ solution was consumed. The beaker was taken out of the ultrasonic bath and was allowed to settle for 1 hour. The solution along with the precipitate was centrifuged at 9,000 rpm for 2 minutes. After discarding the liquid, the precipitate was washed in deionized ("DI") water and centrifuged again at 9,000 rpm for 2 minutes. The precipitate was retrieved and dried under vacuum at 80° C. for 2 hours. Finally the resulting dried precipitate powder was annealed in air at 200° C. for 12 hours.

Preparation of $MnO_2$ Electrode:
The Alpha-MnO2 as prepared above (70 wt %) was mixed with acetylene black (20 wt %) and polyvinylidene fluoride ("PVDF") powder (10 wt %). A few drops of 1-methyl-2-pyrrolidinone was added as required to dissolve the PVDF powder, and the mixture was ground into a thick paste. The paste was applied onto a graphite sheet at a density of 0.1 $g/cm_2$ to form an electrode. The electrode was subsequently baked at a temperature of 130° C. under vacuum for 4 hours.

Figure 3:
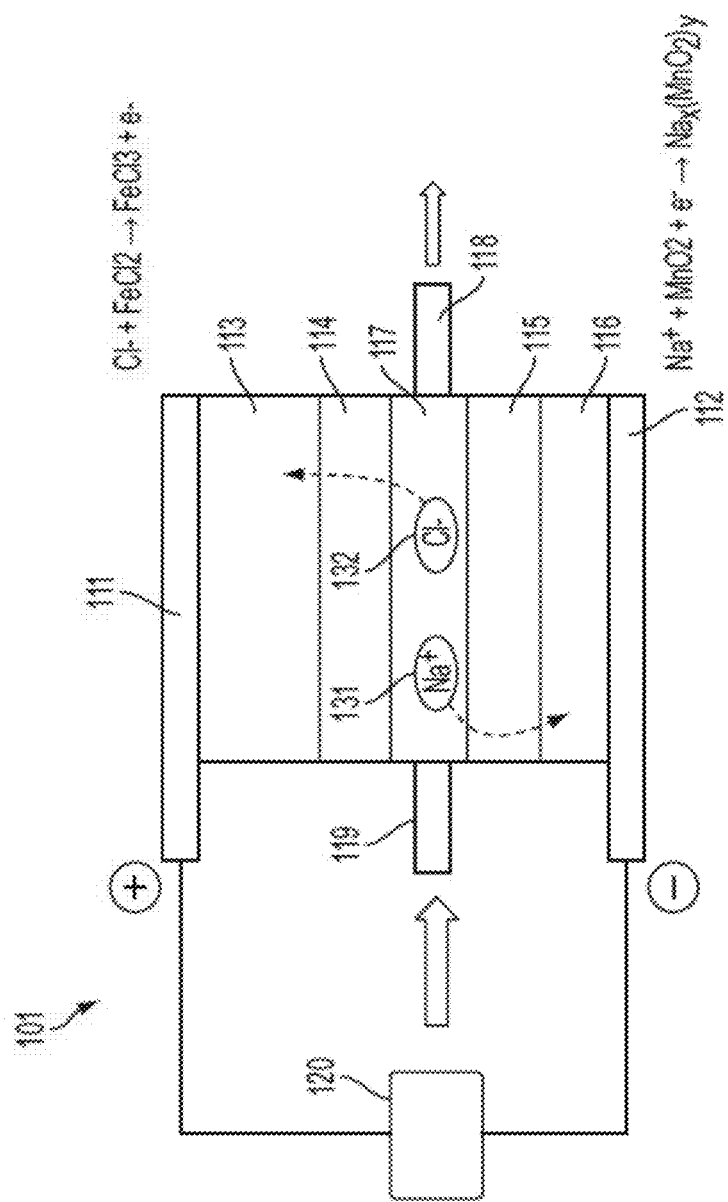
FIG. 3 is a representation of the disclosed desalination device in a desalination (charging) mode.

Assembly of Electrochemical Desalination Cell:
FIG. 3 is a representation of the disclosed desalination device in a desalination (charging) mode. As shown in FIG. 3, an electrochemical desalination cell was formed by a stack containing a first graphite plate electrode 111, a chamber 113 containing an iron electrolyte, a first porous separator (such as an anion exchange membrane) 114, a main flow chamber 117, an optional second ion exchange membrane (which can be a porous membrane) 115, and an $MnO_2$ layer 116 already mounted on a second graphite plate electrode 112. Generally speaking, the $MnO_2$ layer 116 can be replaced any material that is suitable for the intercalation material portion 1160. The chamber 117 had an inlet port 119 and an outlet port 118, through which saline water flowed as required.

The first electrode 111 was connected to the positive terminal and the second electrode 112 was connected to the negative of a power supply 120 during charging (desalinating).

The optional second ion exchange membrane 115 can prevent particulate matter in the flow stream from making contact with the $MnO_2$ layer 116, thus helping to prevent or reduce abrasive loss of the $MnO_2$ layer.

In an exemplary embodiment, the volume of iron electrolyte in chamber 113 was about 16 cc, and the liquid volume of the main flow chamber 117 was about 4 cc. The volume of iron electrolyte in chamber 113 ranged from about 5 cc to about 25 cc, and the liquid volume of the main flow chamber 117 ranged from about 1 cc to about 5 cc.

Experimental Result:
Solution A having a typical sea water composition and a salinity of 35,000 TDS was injected through the inlet port 119 to fill the chamber 117. A maximum of 1.8V was applied to the cell 101 with a maximum current setting of 250 mA. The cell current started at 250 mA and gradually dropped to 25 mA, at which point the charging was stopped. The solution in chamber 117 was removed through the outlet port 118 by a syringe and stored as solution B.

FIG. 4 is a representation of the disclosed desalination device in a concentration (discharging) mode. A fresh batch of solution A was injected into the chamber 117 through the inlet port 119, and the two terminals 111 and 112 were connected to an electrical load 160 as shown in FIG. 4. The discharge started at a current of 200 mA and was continued until the current and voltage dropped to 20 mA and 0.2V, respectively. The solution in chamber 117 was removed through the outlet port 118 by a syringe and stored as solution C.

The TDS values of solutions B and C were measured. Solution B had a TDS of 12,000, and solution C had a TDS of 56,000. Clearly, solution B had been desalinated and solution C had been resalinated. The discharge process as described in FIG. 4 gives the system an opportunity to recover much of the energy spent in the desalination process, thus greatly improving the system efficiency.

As shown in FIG. 3, upon application of the voltage on the cell from power supply 120, the $Cl^-$ ion 132 in the main chamber 117 moves through the AEM 114 into the iron electrolyte and converts $FeCl_2$ to $FeCl_3$. The $Fe^{2+}$ or $Fe^{3+}$ ions cannot move in the opposite direction due to the high selectivity of the AEM. At the same time, the $Na^+$ ion 131 in the main chamber 117 moves through the optional second ion exchange membrane 115 and intercalates into the $MnO_2$ layer 116. Removal of the individual ions $Na^+$ and $Cl^-$ constitutes the desalination process.

As shown in FIG. 4, upon releasing the voltage and providing an electron path in the form of the electrical load 160, the reverse redox reaction takes place. In the iron electrolyte chamber 113, the $Cl^-$ ion 132 is liberated due to the reduction of $FeCl_3$ to $FeCl_2$, and progresses through the AEM 114 into the main chamber 117. $Na^+$ ions from the chamber 117 are substantially not permitted to pass into the iron electrolyte due to the selectivity of the AEM 114. At the same time, the $Na^+$ ion 131 de-intercalates from the $MnO_2$ layer 116 and travels through the optional second ion exchange membrane 115 into the main chamber 117. Addition of the individual ions $Na^+$ and $Cl^-$ constitutes the resalination process.

Other Embodiments:

The iron electrolyte will gradually be contaminated with NaCl and other salts from the saline water, as the AEM is not 100% selective. Also, iron molarities of different magnitudes may be required at different steps of the process. Therefore, making the iron electrolyte dynamic, for example by allowing the iron electrolyte to flow in and out of the system for treatment, reconditioning, or discarding, may result in an improvement of the conductance of the cell, due to replenishment of fresh electrolyte.

The main saline water electrolyte may flow as either a batch or as a continuous process which optimizes the desalination efficiency. In addition, the same process can be divided into several cells with different parameters that operate at different saline ranges so that the overall efficiency can be optimized.

At times the $MnO_2$ electrode may not be fully depolarized due to the lagging kinetics of de-intercalation. The system may be set up in such a way that the cell reverses its polarity for a known amount of time, keeping a tab on voltage and current, thus depolarizing and rejuvenating the $MnO_2$ matrix.

The system may be comprised of several cells, operating with automated intelligence so that while some cells are desalinating, some are resalinating and some are being depolarized. This electrochemical cell works well with high conductivity water, and therefore as the desalination proceeds, the cell current and efficiency decreases. At low salination levels, other technologies, such as capacitive and RO desalination may be more effective. It is therefore possible that the embodiments described herein can be used as an upstream desalination device to reduce the initial TDS to a lower value, at which point another technology can be used downstream so that the overall efficiency of the entire plant is optimized.

In a practical system, several cells may be put electrically in series and hydraulically in parallel to make an electrochemical stack to increase the material utilization. A stack may comprise of typically 1 to 100 cells.

As used herein, the terms "a", "an", and "the" are intended to encompass the plural as well as the singular. In other words, for ease of reference only, the terms "a" or "an" or "the" may be used herein, such as "a chamber", "an electrode", "the solution", etc., but are intended, unless explicitly indicated to the contrary, to mean "at least one," such as "at least one chamber", "at least one electrode", "the at least one solution", etc. This is true even if the term "at least one" is used in one instance, and "a" or "an" or "the" is used in another instance, e.g. in the same paragraph or section. Furthermore, as used herein, the phrase "at least one" means one or more, and thus includes individual components as well as mixtures/combinations.

The term "comprising" (and its grammatical variations) as used herein is used in the inclusive sense of "having" or "including," with which it may be used interchangeably. These terms are not to be construed as being used in the exclusive sense of "consisting only of" unless explicitly so stated.

Other than where expressly indicated, all numbers expressing quantities of ingredients and/or reaction conditions are to be understood as being modified in all instances by the term "about." This includes terms such as "all" or "none" and variants thereof. As used herein, the modifier "about" means within the limits that one of skill in the art would expect with regard to the particular quantity defined; this may be, for example, in various embodiments, ±10% of the indicated number, ±5% of the indicated number, ±2% of the indicated number, ±1% of the indicated number, ±0.5% of the indicated number, or ±0.1% of the indicated number.

Additionally, where ranges are given, it is understood that the endpoints of the range define additional embodiments, and that subranges including those not expressly recited are also intended to include additional embodiments.

As used herein, "formed from," "generated by," and variations thereof, mean obtained from chemical reaction of, wherein "chemical reaction," includes spontaneous chemical reactions and induced chemical reactions. As used herein, the phrases "formed from" and "generated by" are open ended and do not limit the components of the composition to those listed.

The compositions and methods according to the present disclosure can comprise, consist of, or consist essentially of the elements and limitations described herein, as well as any additional or optional ingredients, components, or limitations described herein or otherwise known in the art.

It should be understood that, unless explicitly stated otherwise, the steps of various methods described herein may be performed in any order, and not all steps must be performed, yet the methods are still intended to be within the scope of the disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for the treatment of water, the system comprising at least an electrochemical desalination battery (EDB) unit comprising:
at least one water chamber configured to hold water to be treated;
at least one negative-ion redox electrode comprising a solution of an electrolyte material selected from cerium chloride, germanium chloride, vanadium chloride, europium chloride, and ferrous chloride, and capable of accepting, and having a reversible redox reaction with, at least one negative ion in the water;
at least one positive-ion redox electrode capable of accepting, and having a reversible redox reaction with, at least one positive ion in the water, wherein the positive-ion redox electrode is immersed in the water chamber or separated from the water chamber by an optional porous separator; and
an ion exchange membrane separating the at least one negative-ion redox electrode from the water chamber.

2. The system of claim 1, further comprising a capacitive deionization (CD) unit connected to the EDB unit via a water port and comprising a first electrode, a second electrode, and a water flow region located between the first and second electrodes.

3. The system of claim 2, wherein:
the EDB unit is configured to operate alternately in a desalination mode and in a salination mode;
ions are released from the at least one negative-ion redox electrode and the at least one positive-ion redox electrode, and energy is stored in the EDB unit in the salination mode; and
the EDB unit desalinates water therein while releasing stored energy as output power employing the at least one negative-ion redox electrode as a positive output electrode and the at least one positive-ion redox electrode as a negative output electrode in the desalination mode.

4. The system of claim 3, wherein the CD unit performs a desalination process while the EDB unit operates in the desalination mode, and performs a salination process while the EDB unit operates in the salination mode.

5. The system of claim 3, wherein at least a fraction of the output power generated from the EDB unit is applied across the first and second electrodes of the CD unit during the desalination mode.

6. The system of claim 3, further comprising a water flow control device to induce flow of water in different directions between the desalination mode and the salination mode, wherein:
the water flow control device induces water to flow from the EDB unit to the CD unit during the desalination mode; and
the water flow control device induces water to flow from the CD unit to the EDB unit during the salination mode.

7. The system of claim 3, wherein a combination of the EDB unit and the CD unit is configured to generate water having a total dissolved solid (TDS) count not greater than about 500 mg per liter in the desalination mode.

8. The system of claim 1, wherein a separation distance between the anion exchange membrane and the at least one positive-ion redox electrode decreases along a direction of water flow during the desalination mode.

9. The system of claim 1, wherein the cathode comprises a compound selected from manganese oxide, copper hexacyanoferrate, prussian blue derivatives, vanadium pentoxide, and sodium ferricyanide.

10. The system of claim 1, further comprising:
a set of electrical switches configured to switch electrical connections for the at least one negative-ion redox electrode and the at least one positive-ion redox electrode between a desalination mode and a salination mode during operation of the EDB unit, wherein:
the set of electrical switches is configured to connect the at least one negative-ion redox electrode to a positive output voltage node of a power supply unit and connects the at least one positive-ion redox electrode to a negative output voltage node of the power supply unit, respectively, in the salination mode in which ions are released from the at least one negative-ion redox electrode and the at least one positive-ion redox electrode and energy is stored in the EDB unit; and
the set of electrical switches is configured to connect the at least one negative-ion redox electrode to a positive electrode of an electrical load and connects the at least one positive-ion redox electrode to a negative electrode of the electrical load, respectively, in the desalination mode in which the EDB unit desalinates water therein while releasing stored energy as output power employing the at least one negative-ion redox electrode as a positive output electrode and the at least one positive-ion redox electrode as a negative output electrode.

11. The system of claim 10, wherein:
the electrical load comprises a power grid to which the EDB unit supplies electrical power through an inverter; and
the set of electrical switches constitutes components of an operational mode control device that is configured to select between the desalination mode and the salination mode based on presence or absence of power demand from the power grid.

12. The system of claim 1, wherein water in the EDB unit is configured to reduce a total dissolved salt count in processed water by at least about 50% during the desalination mode, and is configured to at least double a total dissolved salt count in processed water during the salination mode.

13. A method of desalinating water, comprising:
providing an electrochemical desalination battery (EDB) unit comprising:
at least one water chamber configured to hold water to be treated;
at least one negative-ion redox electrode comprising a solution of an electrolyte material selected from cerium chloride, germanium chloride, vanadium chloride, europium chloride, and ferrous chloride, and capable of accepting, and having a reversible redox reaction with, at least one negative ion in the water;
at least one positive-ion redox electrode capable of accepting, and having a reversible redox reaction with, at least one positive ion in the water, wherein the positive-ion redox electrode is immersed in the water chamber or separated from the water chamber by an optional porous separator; and
an ion exchange membrane separating the at least one negative-ion redox electrode from the water chamber;
transporting water having a first salinity into the at least one water chamber;

desalinating the water having the first salinity to provide water having a second salinity that is lower than the first salinity employing the EDB unit; and removing the water having the second salinity from the EDB unit.

14. The method of claim 13, further comprising:

transporting the water having the second salinity into a capacitive deionization (CD) unit comprising a first electrode, a second electrode, and a water flow region located between the first and second electrodes; and desalinating the water transported into the CD unit to provide water having a third salinity that is lower than the second salinity.

15. The method of claim 14, further comprising inducing flow of water in different directions between a desalination mode and the salination mode employing a water flow control device, wherein:

the water flow control device induces water to flow from the EDB unit to the CD unit during the desalination mode; and the water flow control device induces water to flow from the CD unit to the EDB unit during the salination mode.

16. The method of claim 13, further comprising:

connecting the at least one negative-ion redox electrode to a positive output voltage node of a power supply unit and connecting the at least one positive-ion redox electrode to a negative output voltage node of the power supply unit, respectively, in a salination mode in which ions are released from the at least one negative-ion redox electrode and the at least one positive-ion redox electrode and energy is stored in the EDB unit; and connecting the at least one negative-ion redox electrode to a positive electrode of an electrical load and connects the at least one positive-ion redox electrode to a negative electrode of the electrical load, respectively, in a desalination mode in which the EDB unit desalinates water therein while releasing stored energy as output power employing the at least one negative-ion redox electrode as a positive output electrode and the at least one positive-ion redox electrode as a negative output electrode.

17. The method of claim 16, wherein:

the electrical load comprises a power grid powered at least in part by the EDB unit;

operating the EDB unit in the desalination mode when power demand from the power grid is present; and operating the EDB unit in the salination mode when power demand from the power grid is absent.

18. A system for treatment of water and energy storage, comprising:

an electrochemical desalination battery (EDB) unit comprising an anode and a cathode, wherein the anode is capable of accepting, and having a reversible redox reaction with, negative ions in water, and the cathode is capable of accepting, and having a reversible redox reaction with, positive ions from water;

a capacitive deionization (CD) unit comprising a first electrode, a second electrode, and a water flow region located between the first and second electrodes; and a water flow control device to induce flow of water in different directions between a desalination mode and a salination mode, wherein:

the water flow control device induces water to flow from the EDB unit to the CD unit during the desalination mode;

the CD unit performs a desalination process while the EDB unit operates in the desalination mode to desalinate water therein; and the CD unit performs a salination process while the EDB unit operates in the salination mode to salinate water therein.

19. The system of claim 18, wherein:

the anode comprises a material selected from cerium chloride, germanium chloride, vanadium chloride, europium chloride, and ferrous chloride, zinc, gallium, cerium, iron, copper, and gallium; and the cathode comprises a compound selected from manganese oxide, copper hexacyanoferrate, prussian blue derivatives, vanadium pentoxide, and sodium ferricyanide.

20. The system of claim 18, further comprising a set of electrical switches configured to switch electrical connections for the anode and the cathode between the desalination mode and the salination mode during operation of the EDB unit, wherein:

the set of electrical switches is configured to connect the anode to a positive output voltage node of a power supply unit and connects the cathode to a negative output voltage node of the power supply unit, respectively, in the salination mode in which ions are released from the anode and the cathode and energy is stored in the EDB unit;

the set of electrical switches is configured to connect the anode to a positive electrode of an electrical load and connects the cathode to a negative electrode of the electrical load, respectively, in the desalination mode in which the EDB unit desalinates water therein while releasing stored energy as output power employing the anode as a positive output electrode and the cathode as a negative output electrode;

a combination of the EDB unit and the CD unit is configured to generate water having a total dissolved solid (TDS) count not greater than about 500 mg per liter in the desalination mode; and the electrical load comprises a power grid powered at least in part by the EDB unit.

* * * * *